(12) United States Patent
Mccormac et al.

(10) Patent No.: US 10,915,731 B2
(45) Date of Patent: Feb. 9, 2021

(54) DETECTING OBJECTS IN VIDEO DATA

(71) Applicant: IMPERIAL COLLEGE INNOVATIONS LIMITED, London (GB)

(72) Inventors: John Brendan Mccormac, Banbridge (GB); Ankur Handa, London (GB); Andrew Davison, London (GB); Stefan Leutenegger, London (GB)

(73) Assignee: Imperial College Innovations Limited, London (GB)

( * ) Notice: Subject to any disclaimer, the term of this patent is extended or adjusted under 35 U.S.C. 154(b) by 61 days.

(21) Appl. No.: 16/228,517

(22) Filed: Dec. 20, 2018

(65) Prior Publication Data

US 2019/0147220 A1  May 16, 2019

Related U.S. Application Data

(63) Continuation of application No. PCT/GB2017/051679, filed on Jun. 9, 2017.

(30) Foreign Application Priority Data

Jun. 24, 2016 (GB) .................................. 1611033.0

(51) Int. Cl.
*G06K 9/00* (2006.01)
*G06K 9/62* (2006.01)

(52) U.S. Cl.
CPC ..... *G06K 9/00208* (2013.01); *G06K 9/00201* (2013.01); *G06K 9/00718* (2013.01);
(Continued)

(58) Field of Classification Search
None
See application file for complete search history.

(56) References Cited

U.S. PATENT DOCUMENTS

2006/0280343 A1  12/2006  Lee
2012/0148162 A1   6/2012  Zhang et al.
(Continued)

FOREIGN PATENT DOCUMENTS

RU   2518940 C2   6/2014
RU   2542928 C2   2/2015
WO   2016189274 A1  12/2016

OTHER PUBLICATIONS

Alexander Hermans, Georgios Floros and Bastian Leibe. Dense 3d semantic mapping of indoor scenes from RGB-D images. 2014 IEEE International Conference on Robotics and Automation.
(Continued)

*Primary Examiner* — Leon Flores
(74) *Attorney, Agent, or Firm* — EIP US LLP

(57) ABSTRACT

Certain examples described herein enable semantically-labelled representations of a three-dimensional (3D) space to be generated from video data. In described examples, a 3D representation is a surface element or 'surfel' representation, where the geometry of the space is modelled using a plurality of surfaces that are defined within a 3D co-ordinate system. Object-label probability values for spatial elements of frames of video data may be determined using a two-dimensional image classifier. Surface elements that correspond to the spatial elements are identified based on a projection of the surface element representation using an estimated pose for a frame. Object-label probability values for the surface elements are then updated based on the object-label probability values for corresponding spatial elements. This results in a semantically-labelled 3D surface element representation of objects present in the video data. This data enables computer vision and/or robotic applications to make better use of the 3D representation.

34 Claims, 10 Drawing Sheets

(52) U.S. Cl.
CPC ......... *G06K 9/6232* (2013.01); *G06K 9/6257* (2013.01); *G06K 9/6277* (2013.01)

(56) References Cited

U.S. PATENT DOCUMENTS

| | | | |
|---|---|---|---|
| 2013/0004060 A1 | 1/2013 | Bell | |
| 2013/0250050 A1* | 9/2013 | Kanaujia | H04N 13/106 348/42 |
| 2015/0332464 A1 | 11/2015 | O'Keefe | |
| 2016/0180195 A1* | 6/2016 | Martinson | G06K 9/6202 382/103 |

OTHER PUBLICATIONS

Andreas Nuchter and Joachim Hertzberg. Towards semantic maps from mobile robots. Robotics and Autonomous Systems 56 (2008) 915-926.
Stuckler et al: Dense Real-Time Mapping of Object-Class Semantics from RGB-D video, JRTIP vol. 10. Issue 4, pp. 599-609, Springer, 2015.
Thomas Whelan et al. ElasticFusion: Dense SLAM without a Pose Graph. Robotics: Science and Systems XI. Jul. 13, 2015, XP055246993.
Zhou Qian-Yi et al. Elastic Fragments for Dense Scene Reconstruction. 2013 IEEE International Conference on Computer Vision, IEEE, Dec. 1, 2013, pp. 473-480, XP032572963.
Thomas Whelan et al. ElasticFusion: Real-time dense SLAM and light source estimation. International Journal of Robotics Research. vol. 35, No. 14 Sep. 30, 2016, pp. 1697-1716, XP055401597.
J. Stückler, B. Waldvogel, H. Schulz, and S. Behnke in the Journal of Real-Time Image Processing JRTIP, vol. 10, No. 4, pp. 599-609, 2015.
R.F. Salas-Moreno et al. "SLAM++: Simultaneous Localisation and Mapping at the Level of Objects". Proceedings of the IEEE Conference on Computer Vision and Pattern Recognition (CVPR), 2013.
Pfister et al. "Surfels: Surface elements as rendering primitives", Proceedings of the 27th annual conference on computer graphics and interactive techniques, ACM Press/Addision-Wesley Publising Co., Jul. 2000.
H. Noh et al. "Learning deconvolution network for semantic segmentation", arXiv May 17, 2015.
N. Silberman et al. "Indoor Segmentation and Support Inference from RGBD Images", ECCV 2012.
International Search Report and Written Opinion dated Sep. 13, 2017 for PCT Application No. PCT/GB2017/051679.
Combined Search and Examination Report dated Dec. 19, 2016 for GB Application No. GB1611033.0.
Written Opinion dated May 16, 2018 for PCT Application No. PCT/GB2017/051679.
B. Glocker, J. Shotton, A. Criminisi, and S. Izadi, TVCG, Sep. 2014.
Russian Office Action dated Oct. 30, 2020 for Russian Application No. 2019101759.

* cited by examiner

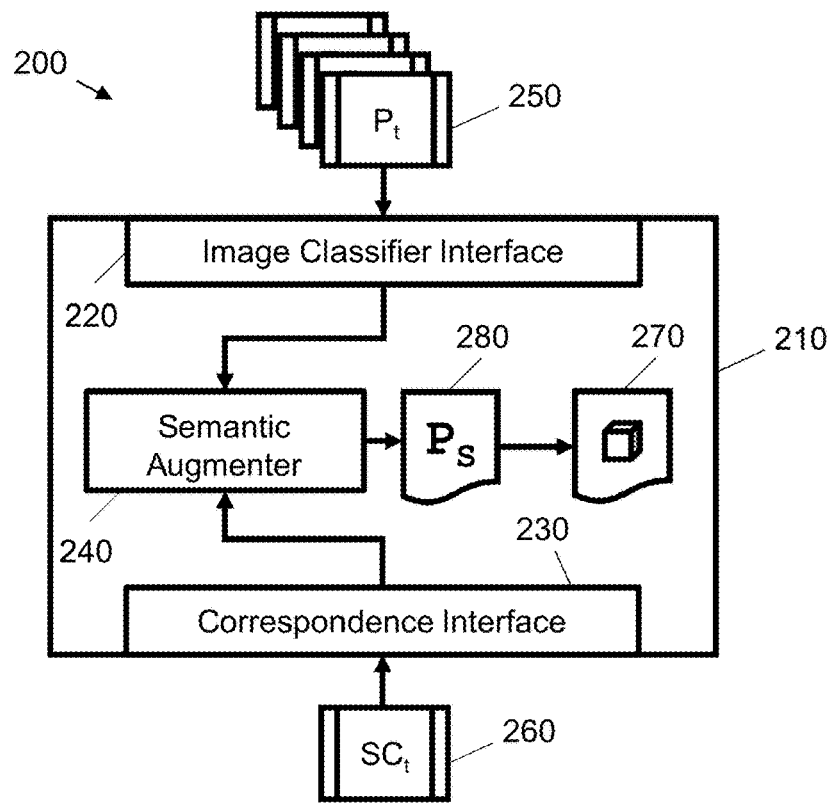
*Fig. 2*
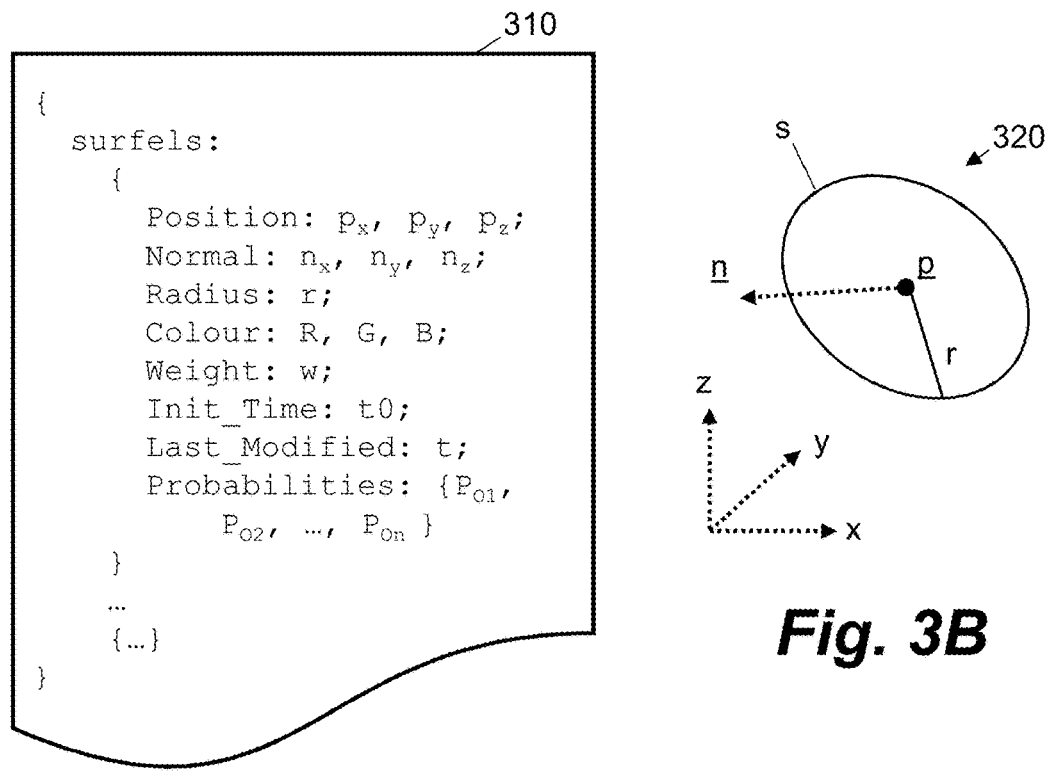
*Fig. 3A*
*Fig. 3B*

DETECTING OBJECTS IN VIDEO DATA

CROSS-REFERENCE TO RELATED APPLICATIONS

This application is a continuation of International Application No. PCT/GB2017/051679, filed Jun. 9, 2017, which claims priority to GB Application No. GB1611033.0, filed Jun. 24, 2016, under 35 U.S.C. § 119(a). Each of the above-referenced patent applications is incorporated by reference in its entirety.

BACKGROUND OF THE INVENTION

Field of the Invention

The present invention relates to video processing. In particular, the present invention relates to processing frames of video data and labelling surface elements within a representation of a three-dimensional (3D) space. The invention has particular, but not exclusive, relevance to generating a semantically-labelled representation of a 3D space for use in robotics and/or augmented reality applications.

Description of the Related Technology

In the field of computer vision and robotics, there is often a need to construct a representation of a 3D space. Constructing a representation of a 3D space allows a real-world environment to be mapped to a virtual or digital realm, where it may be used and manipulated by electronic devices. For example, a moveable robotic device may require a representation of a 3D space to allow simultaneously location and mapping, and thus navigation of its environment. Alternatively, a representation of a 3D space may enable 3D models of objects within that space to be identified and/or extracted.

There are several techniques available for constructing a representation of a 3D space. For example, structure from motion and multi-view stereo are two such techniques. Many techniques extract features from images of the 3D space, such as corners and/or edges, e.g. using Scale Invariant Feature Transforms (SIFT) and/or Speeded Up Robust Features (SURF) algorithms. These extracted features may then be correlated from image to image to build a 3D representation. This 3D representation is typically provided as a 3D point cloud, i.e. as a series of defined X, Y and Z co-ordinates within a defined 3D volume. Other approaches may divide the defined 3D volume into a number of unit volumes or "voxels". A set of 3D points aligned along a series of common Z co-ordinates may model a floor or a table top. In certain cases, a point cloud may be converted to a polygon mesh for rendering on a display, in a process known as surface rendering.

When constructing a representation of a 3D space, techniques are often divided into "sparse" and "dense" categories. Techniques that use a reduced number of points or features to generate a representation are referred to as "sparse". For example, these techniques may use ten to a hundred features and/or points to generate the representation. These may be contrasted with "dense" techniques that generate representations with many thousands or millions of points. "Sparse" techniques have an advantage that they are easier to implement in real-time, e.g. at a frame rate of 30 frames-per-second or so; using a limited number of points or features limits the extent of the processing that is required to construct the 3D representation. Comparatively it is more difficult to perform real-time "dense" mapping and processing of a 3D space due to computational requirements. For example, it is often preferred to carry out a "dense" mapping of a 3D space off-line, e.g. it may take 10 hours to generate a "dense" representation from 30 minutes of provided image data, plus a similar amount of time again to apply any subsequent processing of the representation.

Once a 3D representation of a space has been generated there is then a further problem of the utility of the representation. For example, many robotics applications not only need a definition of the geometry of the space but also require useful information regarding what is present in the space. This is referred to in computer vision fields as "semantic" knowledge of the space. Knowing what is present within a space is a process that happens subconsciously in the human brain; as such it is easy to underestimate the difficulty of constructing a machine with equivalent abilities. For example, when human beings observe an object such as a cup in a 3D space, many different areas of the brain are activated in additional to core visual processing networks including those relating to proprioception (e.g. movement towards the object) and language processing. However, many computer vision systems have a very naïve understanding of a space, these systems only "know" the geometry of the space.

In the field of computer vision and robotics, the inclusion of rich semantic information within a representation of a space would enable a much greater range of functionality than geometry alone. For example, in domestic robotics a simple fetching task requires knowledge of both what something is, as well as where it is located. Similarly, the ability to query semantic information within a representation is useful for humans directly, e.g. providing a database for answering spoken queries about the semantics of a previously-generated representation: "How many chairs do we have in the conference room? What is the distance between the lectern and its nearest chair?"

Research into generating semantic information for a 3D representation is in its infancy. In the past, effort has primarily been divided between the relatively separate fields of two-dimensional (2D) image classification (e.g. "does this image of a scene contain a cat?") and 3D scene mapping. In the latter category, many of the existing systems are configured to operate off-line on large datasets (e.g. overnight or over a series of days). Providing 3D scene mapping in real-time is a desired aim for real-world applications.

The paper Dense 3D Semantic Mapping of Indoor Scenes from RGB-D Images by A. Hermans, G. Floros and B. Leibe published in the Proceedings of the IEEE International Conference on Robotics and Automation (ICRA) in 2014 describes a method of providing a semantically annotated 3D reconstruction of a surrounding scene, where every 3D point is assigned a semantic label. The paper comments that there is no clear-cut method for the transfer of 2D labels into a globally consistent 3D reconstruction. The described method builds a point cloud reconstruction of the scene and assigns a semantic label to each 3D point. Image labels are computed for 2D images using Randomized Decision Forests and are then transferred to the point cloud via Bayesian updates and dense pairwise Conditional Random Fields (CRFs). Points are tracked within a global 3D space using a zero-velocity Kalman filter. While the methods that are presented are encouraging, run-time performance was 4.6 Hz, which would prohibit processing a live video feed.

R. F. Salas-Moreno, R. A. Newcombe, H. Strasdat, P. H. J. Kelly, and A. J. Davison in the paper SLAM++: Simultaneous Localisation and Mapping at the Level of Objects published in the Proceedings of the IEEE Conference on Computer Vision and Pattern Recognition (CVPR) in 2013 describe methods of real-time 3D object recognition within indoor scenes. These methods use a pose-graph representation of the space, where each node in the graph stores either the estimated pose of a recognised object or the historical pose of a camera at a given timestep. This pose-graph representation is then optimised to provide a consistent representation. Loop closures are managed by matching pose graph portions. While providing improvements in the field, the described methods are limited to mapping objects that are present in a pre-defined database and the features used to match template models need to be generated by hand. They also do not provide the dense labelling of entire scenes (e.g. walls, doors, and windows), such labelling being useful for interior navigation.

Given existing techniques, there is still a desire for useable methods of processing video data to enable detection and labelling of objects deemed to be present in a scene. For example, augmented reality and robotic applications desire knowledge of what is visible in a scene to be provided on a real-time or near real-time basis (e.g. at a frame processing rate of greater than 15 Hz). Such applications also typically produce scene observations with large viewpoint variation, e.g. video data with extended "choppy" or "loopy" motion that view portions of a scene from multiple different locations and/or orientations as opposed to simple limited rotation of a camera. For example, non-even terrain or a hand-held capture device may result in frequent changes in capture device position and orientation where areas of a scene are repeatedly observed and re-observed. It is a desire to enable detection and labelling of objects with these variable scene observations.

SUMMARY

According to a first aspect of the present invention there is provided a method for detecting objects in video data, comprising: determining object-label probability values for spatial elements of frames of video data using a two-dimensional image classifier; identifying surface elements in a three-dimensional surface element representation of a space observed in the frames of video data that correspond to the spatial elements, wherein a correspondence between a spatial element and a surface element is determined based on a projection of the surface element representation using an estimated pose for a frame; and updating object-label probability values for the surface elements based on the object-label probability values for corresponding spatial elements to provide a semantically-labelled three-dimensional surface element representation of objects present in the video data.

In certain examples, during processing of said video data, the method may comprise detecting a loop closure event and applying a spatial deformation to the surface element representation, the spatial deformation modifying three-dimensional positions of surface elements in the surface element representation, wherein the spatial deformation modifies the correspondence between spatial elements and surface elements of the surface element representation such that, after the spatial deformation, object-label probability values for a first surface element are updated using object-label probability values for spatial elements that previously corresponded to a second surface element.

Processing the frames of video data may be performed without a pose graph to generate the three-dimensional surface element representation. This may include, on a frame-by-frame basis: comparing a rendered frame generated using the three-dimensional surface element representation with a video data frame from the frames of video data to determine a pose of a capture device for the video data frame; and updating the three-dimensional surface element representation using the pose and image data from the video data frame.

In certain cases, a subset of the frames of video data used to generate the three-dimensional surface element representation are input to the two-dimensional image classifier.

The frames of video data may comprise at least one of colour data, depth data and normal data. In this case, the two-dimensional image classifier is configured to compute object-label probability values based on said at least one of colour data, depth data and normal data for a frame. In certain cases, two or more of colour data, depth data and normal data for a frame may provide input channels for the image classifier.

The two-dimensional image classifier may comprise a convolutional neural network. In this case, the convolutional neural network may be configured to output the object-label probability values as a set of pixel maps for each frame of video data, each pixel map in the set corresponding to a different object label in a set of available object labels. A deconvolutional neural network may be communicatively coupled to the output of the convolutional neural network.

In one case, the method comprises, after the updating of the object-label probability values for the surface elements, regularising the object-label probability values for the surface elements. This may involve applying a conditional random field to the object-label probability values for surface elements in the surface element representation and/or may be based on one or more of: surface element positions, surface element colours, and surface element normals.

In certain examples, a set of one or more surface elements may be replaced with a three-dimensional object definition based on the object-label probability values assigned to said surface elements.

In one example, the method may comprise: annotating surface elements of a three-dimensional surface element representation of a space with object-labels to provide an annotated representation; generating annotated frames of video data from the annotated representation based on a projection of the annotated representation, the projection using an estimated pose for each annotated frame, each annotated frame comprising spatial elements with assigned object-labels; and training the two-dimensional image classifier using the annotated frames of video data.

In another example, the method may comprise the steps of: obtaining a first frame of video data corresponding to an observation of a first portion of an object; generating an image map for the first frame of video data using the two-dimensional image classifier, said image map indicating the presence of the first portion of the object in an area of the first frame; and determining that a surface element does not project onto the area in the first frame and as such not updating object-label probability values for the surface element based image map values in said area. In this example, following detection of a loop closure event the method may comprise: modifying a three-dimensional position of the surface element, obtaining a second frame of video data corresponding to a repeated observation of the first portion of the object; generating an image map for the second frame of video data using the two-dimensional image classifier, said image map indicating the presence of the first portion of the object in an area of the second frame; determining that the modified first surface element does project onto the area of the second frame following the loop closure event; and updating object-label probability values for the surface element based on the image map for the second frame of video data, wherein the object-label probability values for the surface element include fused object predictions for the surface element from multiple viewpoints.

According to a second aspect of the present invention there is provided an apparatus for detecting objects in video data comprising: an image-classifier interface to receive two-dimensional object-label probability distributions for individual frames of video data; a correspondence interface to receive data indicating, for a given frame of video data, a correspondence between spatial elements within the given frame and surface elements in a three-dimensional surface element representation, said correspondence being determined based on a projection of the surface element representation using an estimated pose for the given frame; and a semantic augmenter to iteratively update object-label probability values assigned to individual surface elements in the three-dimensional surface element representation, wherein the semantic augmenter is configured to use, for a given frame of video data, the data received by the correspondence interface to apply the two-dimensional object-label probability distributions received by the image classifier interface to object-label probability values assigned to corresponding surface elements.

In certain examples, the correspondence interface is configured to provide an updated correspondence following a spatial deformation of the surface element representation, the spatial deformation enacting a loop closure within the video data. In these examples, the semantic augmenter may use the updated correspondence to update object-label probability values for a first surface element using object-label probability values for spatial elements that previously corresponded to a second surface element.

In one case, the image-classifier interface is configured to receive a plurality of image maps corresponding to a respective plurality of object labels for a given frame of video data, each image map having pixel values indicative of probability values for an associated object label.

The apparatus may comprise a regulariser to perform regularisation as described above. The semantic augmenter may also be configured to replace a set of one or more surface elements with a three-dimensional object definition based on the object-label probability values assigned to said surface elements.

In the present examples, each surface element in the surface element representation may comprises at least data defining a position of the surface element in three-dimensions and data defining a normal vector for the surface element in three-dimensions. In this case, each surface element represents a two-dimensional area in three-dimensional space.

According to a third aspect of the present invention there is provided a video processing system for detecting objects present in video data comprising the apparatus as described above; a video acquisition interface to obtain frames of video data from a capture device, said frames of video data resulting from relative movement between the capture device and a three-dimensional space over time; and a simultaneous location and mapping (SLAM) system communicatively coupled to the correspondence interface of the apparatus to generate a surface element representation of the three-dimensional space based on the obtained frames of video data, wherein the SLAM system is configured to apply a spatial deformation to the surface element representation to close loops of observation within the frames of video data, said spatial deformation resulting in a new three-dimensional position for at least one modified surface element in the surface element representation.

In this aspect, the SLAM system may comprise: a segmenter configured to segment the three-dimensional surface element representation into at least active and inactive portions based on at least one representation property, wherein the SLAM system is configured to compute an active rendered frame based on a projection from the active portions of the surface element representation to update said representation over time; and a registration engine configured to align active portions of the three-dimensional surface element representation with inactive portions of the three-dimensional surface element representation over time. In this case, the registration engine may be configured to: compute an inactive rendered frame based on a projection from the inactive portions of the three-dimensional surface element representation; determine a spatial deformation that aligns the active rendered frame with the inactive rendered frame; and update the three-dimensional surface element representation by applying the spatial deformation. The SLAM system may also comprise a frame-to-model tracking component configured to compare the active rendered frame to a provided frame from said video data to determine an alignment of the active portions of the three-dimensional surface element representation with the video data. The registration engine may be configured to use a deformation graph to align active portions of the three-dimensional surface element representation with inactive portions of the three-dimensional surface element representation, the deformation graph being computed based on an initialisation time for surface elements, the deformation graph indicating a set of surface-element neighbours for a given surface element that are to be used to modify the given surface element during alignment.

In certain examples, the video processing system comprises a two-dimensional image classifier communicatively coupled to the image-classifier interface to compute object-label probability distributions for frames of the video data obtained from the video acquisition interface. The two-dimensional image classifier may apply processing as described with regard to the first aspect.

According to a fourth aspect of the present invention there is provided a robotic device comprising: at least one capture device to provide frames of video data comprising one or more of depth data and colour data, said depth data indicating a distance from the capture device for a plurality of image elements; the apparatus of the second aspect, or the video processing system of the third aspect, as described above; one or more movement actuators to move the robotic device with the three-dimensional space; and a navigation engine to control the one or more movement actuators, wherein the navigation engine is configured to access the object-label probability values assigned to individual surface elements in the three-dimensional surface element representation to navigate the robotic device within the three-dimensional space.

The navigation engine may be configured to identify a room or entry and exit points for a room based on the object-label probability values assigned to surface elements in the three-dimensional surface element representation.

According to a fifth aspect of the present invention there is provided a mobile computing device comprising at least one capture device arranged to record frames of video data comprising one or more of depth data and colour data, said depth data indicating a distance from the capture device for a plurality of image elements, and the apparatus of the second aspect, or the video processing system of the third aspect, as described above.

According to a fifth aspect of the present invention there is provided a non-transitory computer-readable storage medium comprising computer-executable instructions which, when executed by a processor, cause a computing device to perform the video processing method described above.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2 is a schematic diagram of an apparatus for detecting objects in video data according to an example;
FIG. 3A is a schematic diagram showing example data for a 3D surface element model;
FIG. 3B is a schematic diagram showing attributes of a surface element according to an example.

DETAILED DESCRIPTION OF CERTAIN INVENTIVE EMBODIMENTS

Figure 1A:
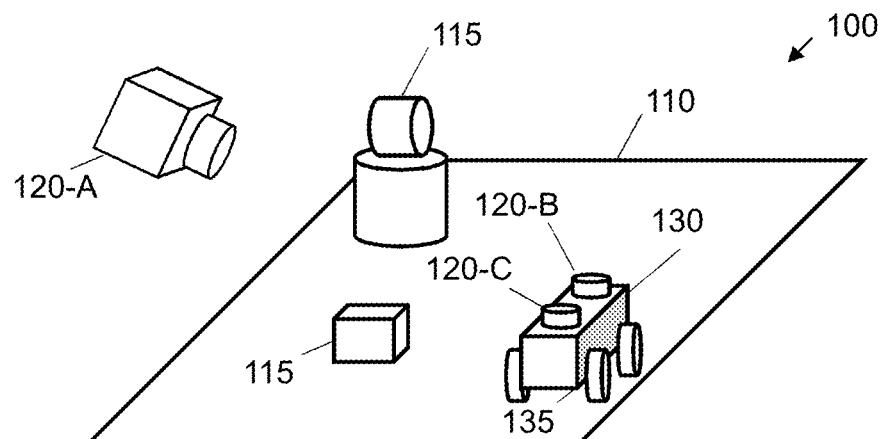
FIG. 1A is a schematic diagram showing an example of a three-dimensional space.

Certain examples described herein enable semantically-labelled 3D representations of a 3D space to be generated from video data. This is referred to as "detecting objects" viewable in a scene: "detection" may refer to a process of determining probabilities for a set of applicable class labels and "objects" may refer to any visible thing or entity with a material presence, e.g. that a robot may interact with. The terms "object" and "class" are used synonymously, both refer to a label or identifier for a real-world entity. In described examples, the 3D representation, which may also be referred to as a map or model, is a surface element or 'surfel' representation, where the geometry of the space is modelled using a plurality of surfaces or areas that are defined within a 3D co-ordinate system. The 3D representation is semantically labelled in that a given surfel within the representation has associated label data (e.g. a string or key) that identifies an object associated with the element, i.e. the object is detected. Object here is considered broadly and includes, amongst many others, entities such as walls, doors, floors and people as well as furniture, other devices, and conventional objects in a home, office and/or exterior space. In this manner, a surfel has additional data that provides meaning to the surfel beyond its geometric or visual properties (e.g. colour). This data enables computer vision and/or robotic applications to make better use of the 3D representation. For example, if a map for a household robot comprises data identifying objects within a space, the robot can distinguish a 'door' from a 'wall'. Hence, map features that from a geometric viewpoint are similar (e.g. doors and walls are both vertical planes) may be distinguished and used for movement, e.g. this information can then be used by the robot to enter or exit the space. Labels may be assigned probabilistically, enabling beliefs to be updated in a Bayesian manner during navigation.

Certain examples described herein are particular suited to processing real-time video feeds at frame-rates equal to or greater than 15 Hz. This is possible by using a representation of the space that does not rely on the calculation of a pose-graph; frame-to-representation tracking and fusion occurs on a frame-by-frame basis, wherein the representation is spatially deformed following detection of loop closure events. In certain examples, a representation is split into active and inactive portions, wherein only the active portions are used to update the representation, wherein inactive portions are not used to update the representation. This updating may comprise fusing frames of video data with the representation, e.g. determining new surfels, modifying existing surfels or deleting old surfels. This helps to reduce computational demands as only a subset of a representation of a space may be used at any one time to update the representation following new observations of the space. In addition to updating the representation, the active portions may also be used in a tracking operation that seeks to determine an accurate current representation of the location and orientation of a capture device in relation to the representation. Again, using only a subset of the representation of the space enables computational demands to be reduced, as compared to tracking based on a full representation of the space.

Certain examples described herein provide increased detection accuracy for video data that comprises loops of observation, e.g. where an object is passed two or more times and/or viewed from different angles. In examples, class or object label probabilities associated with surfels are constantly being updated based on new frames of data. When an existing portion of the representation is re-observed, a loop closure event is detected and surfels are non-rigidly deformed to provide a consistent global map of the space; however, assigned probabilities are maintained. As such, in a probability update operation on the surfel representation, new sets of probabilities may be used following a deformation. In tests this has resulted in improved performance in detection accuracy. In essence, "loopy" motions enable multiple separate observations of a given object. These separate observations each provide sets of 2D object classifications. The deformation process then means that 2D classification probabilities from the separate frames are consistently applied to the same sets of surfels. In certain cases, this deformation may be non-rigid and may use a deformation graph to apply a transformation to surfels. A deformation graph may be sparse and/or may be embedded in the space, e.g. be associated with the surfels. These techniques differ from those that require a pose graph, e.g. a probabilistic representation of the location and orientation of the camera device, which is used to rigidly transform independent key frames of image data. Indeed, by aligning different portions of a representation and deforming where appropriate, a pose graph is not required, e.g. there is less need to track a correct pose at any one time as drift and errors may be corrected by alignment and deformation. This again aids real-time operation and simplifies processing.

Figure 1B:
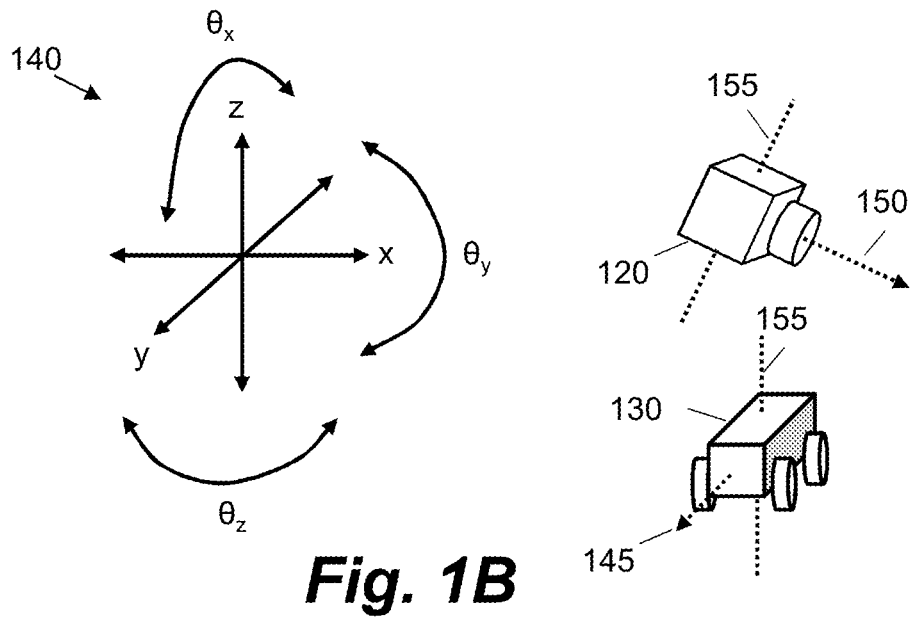
FIG. 1B is a schematic diagram showing available degrees of freedom for an example capture device.
Figure 1C:
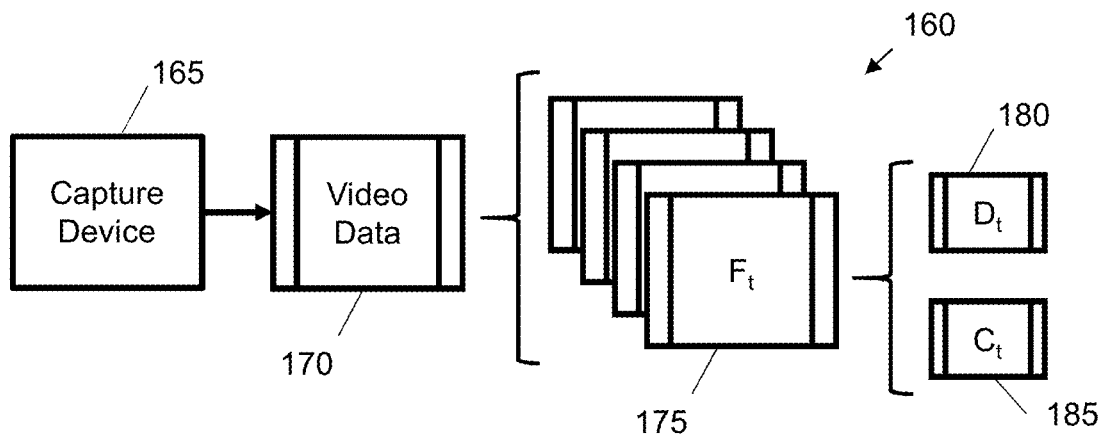
FIG. 1C is a schematic diagram showing video data generated by an example capture device.

FIGS. 1A and 1B schematically show an example of a 3D space and the capture of video data associated with that space. FIG. 1C then shows a capture device configured to generate video data when viewing the space. These examples are presented to better explain certain features described herein and should not be considered limiting; certain features have been omitted and simplified for ease of explanation.

FIG. 1A shows an example 100 of a three-dimensional space 110. The three-dimensional space 110 may be an internal and/or an external physical space, e.g. at least a portion of a room or a geographical location. The three-dimensional space 110 in this example 100 comprises a number of physical objects 115 that are located within the three-dimensional space. These objects 115 may comprise one or more of, amongst others: people, electronic devices, furniture, animals, building portions and equipment. Although the 3D space 110 in FIG. 1A is shown with a lower surface this need not be the case in all implementations, for example an environment may be aerial or within extra-terrestrial space.

The example 100 also shows various example capture devices 120 that may be used to capture video data associated with the 3D space 110. A capture device 120 may comprise a camera that is arranged to record data that results from observing the 3D space 110, either in digital or analogue form. In certain cases, the capture device 120 is moveable, e.g. may be arranged to capture different frames corresponding to different observed portions of the 3D space 110. The capture device 120 may be moveable with reference to a static mounting, e.g. may comprise actuators to change the position and/or orientation of the camera with regard to the three-dimensional space 110. In another case, the capture device 120 may be a handheld device operated and moved by a human user.

In FIG. 1A, multiple capture devices 120 are also shown coupled to a robotic device 130 that is arranged to move within the 3D space 110. The robotic device 135 may comprise an autonomous aerial and/or terrestrial mobile device. In the present example 100, the robotic device 130 comprises actuators 135 that enable the device to navigate the 3D space 110. These actuators 135 comprise wheels in the illustration; in other cases they may comprise tracks, burrowing mechanisms, rotors, etc. One or more capture devices 120-A, B may be statically or moveably mounted on such a device. Each capture device 120-A, B may capture a different type of video data and/or may comprise a stereo image source. In one case, capture device 120-A may capture depth data, e.g. using a remote sensing technology such as infrared, ultrasound and/or radar (including Light Detection and Ranging—LIDAR technologies), while capture device 120-B captures photometric data, e.g. colour or grayscale images (or vice versa). In one case, one or more of the capture devices 120-A, B may be moveable independently of the robotic device 130. In one case, one or more of the capture devices 120-A, B may be mounted upon a rotating mechanism, e.g. that rotates in an angled arc and/or that rotates by 360 degrees, and/or arranged with adapted optics to capture a panorama of a scene (e.g. up to a full 360 degree panorama).

FIG. 1B shows an example 140 of degrees of freedom available to a capture device 120 and/or a robotic device 130. In the case of a capture device such as 120-A, a direction of the device 150 may be co-linear with the axis of a lens or other imaging apparatus. As an example of rotation about one of the three axes, a normal axis 155 is shown in the Figures. Similarly, in the case of robotic device 130, a direction of alignment of the mobile device 145 may be defined. This may indicate a facing of the mobile device and/or a direction of travel. A normal axis 155 is also shown. Although only a single normal axis is shown with reference to the capture device 120 or robotic device 130, these devices may rotate around any one or more of the axes shown schematically as 140 as described below.

More generally, an orientation and location of a capture device may be defined in three-dimensions with reference to six degrees of freedom: a location may be defined within each of the three dimensions, e.g. by an [x, y, z] co-ordinate, and an orientation may be defined by an angle vector representing a rotation about each of the three axes, e.g. $[\theta_x, \theta_y, \theta_z]$. In certain implementations, a capture device may be defined with reference to a restricted set of these six degrees of freedom, e.g. for a capture device on a ground vehicle the z-dimension may be constant. In certain implementations, such as that of robotic device 130, an orientation and location of a capture device coupled to another device may be defined with reference to the orientation and location of that other device, e.g. may be defined with reference to the orientation and location of robotic device 130. In examples described herein the orientation and location of a capture device is defined as the pose of the capture device. The pose of a capture device may vary over time, such that a capture device may have a different pose at a time t+1 than at a time t. In a case of a handheld mobile computing device comprising a capture device, the pose may vary as the handheld device is moved by a user within the 3D space 110.

FIG. 1C shows schematically an example of a capture device configuration. In the example 160 of FIG. 1C, a capture device 165 is configured to generate video data 170. Video data comprises image data that varies with time. If the capture device 165 is a digital camera this may be performed directly, e.g. video data 170 may comprise processed data from a charge-coupled device or complementary metal-oxide-semiconductor (CMOS) sensor. It is also possible to generate video data 170 indirectly, e.g. through processing other image sources such as converting analogue signal sources.

In FIG. 1C, the image data 170 comprises a plurality of frames 175. Each frame 175 may relate to a particular time t in a time period over which images of a 3D space, such as 110 in FIG. 1, are captured (i.e. $F_t$). A frame 175 generally consists of a 2D representation of measured data. For example, a frame 175 may comprise a 2D array or matrix of recorded pixel values at time t. In the example of FIG. 1C, all frames 175 within the video data are the same size, although this need not be the case in all examples. Pixel values within a frame 175 represent a measurement of a particular portion of the 3D space. In the example of FIG. 1C, each frame 175 comprises values for two different forms of image data. A first set of values relate to depth data 180 (e.g. $D_t$). The depth data may comprise an indication of a distance from the capture device, e.g. each pixel or image element value may represent a distance of a portion of the 3D space from the capture device 165. A second set of values relate to photometric data 185 (e.g. colour data $C_t$). These values may comprise Red, Green, Blue pixel values for a given resolution. In other examples, other colour spaces may be used and/or photometric data 185 may comprise mono or grayscale pixel values. In one case, video data 170 may comprise a compressed video stream or file. In this case, frames of video data may be reconstructed from the stream or file, e.g. as the output of a video decoder. Video data may be retrieved from memory locations following pre-processing of video streams or files.

The capture device 165 of FIG. 1C may comprise a so-called RGB-D camera that is arranged to capture both RGB data 185 and depth ("D") data 180. In one case, the RGB-D camera is arranged to capture video data over time. One or more of the depth data 180 and RGB data may be used at any one time. In certain cases, RGB-D data may be combined in a single frame with four or more channels. The depth data 180 may be generated by one or more techniques known in the art, such as a structured light approach wherein an infrared laser projector projects a pattern of infrared light over an observed portion of a three-dimensional space, which is then imaged by a monochrome CMOS image sensor. Examples of these cameras include the Kinect® camera range manufactured by Microsoft Corporation, of Redmond, Wash. in the United States of America, the Xtion® camera range manufactured by ASUSTeK Computer Inc. of Taipei, Taiwan and the Carmine® camera range manufactured by PrimeSense, a subsidiary of Apple Inc. of Cupertino, Calif. in the United States of America. In certain examples an RGB-D camera may be incorporated into a mobile computing device such as a tablet, laptop or mobile telephone. In other examples, an RGB-D camera may be used as a peripheral for a static computing device or may be embedded in a stand-alone device with dedicated processing capabilities. In one case, the capture device 165 may be arranged to store the video data 170 in a coupled data storage device. In another case, the capture device 165 may transmit video data 170 to a coupled computing device, e.g. as a stream of data or on a frame-by-frame basis. The coupled computing device may be directly coupled, e.g. via a universal serial bus (USB) connection, or indirectly coupled, e.g. the video data 170 may be transmitted over one or more computer networks. In yet another case, the capture device 165 may be configured to transmit the video data 170 across one or more computer networks for storage in a network attached storage device. Video data 170 may be stored and/or transmitted on a frame-by-frame basis or in a batch basis, e.g. a plurality of frames may be bundled together. The depth data 180 need not be at the same resolution or frame-rate as the photometric data 185. For example, the depth data 180 may be measured at a lower resolution than the photometric data 185. One or more pre-processing operations may also be performed on the video data 170 before it is used in the later-described examples. In one case, pre-processing may be applied such that the two frame sets have a common size and resolution. In certain cases, separate capture devices may respectively generate depth and photometric data. Further configurations not described herein are also possible.

In certain cases, the capture device may be arranged to perform pre-processing to generate depth data. For example, a hardware sensing device may generate disparity data or data in the form of a plurality of stereo images, wherein one or more of software and hardware are used to process this data to compute depth information. Similarly, depth data may alternatively arise from time of flight camera that output phase images that may be used to reconstruct depth information. As such any suitable technique may be used to generate depth data that forms part of image data 220.

FIG. 1C is provided as an example and, as will be appreciated, different configurations than those shown in the Figure may be used to generate video data 170 for use in the methods and systems described below. Video data 170 may further comprise any measured sensory input that is arranged in a two-dimensional form representative of a captured or recorded view of a 3D space with a capture device. For example, this may comprise just one of depth data or photometric data, electromagnetic imaging, ultrasonic imaging and radar output, amongst others. In these cases only an imaging device associated with the particular form of data may be required, e.g. an RGB device without depth data. In the examples above, frames of depth data $D_t$ may comprise a two-dimensional matrix of depth values. This may be represented as a grayscale image, e.g. where each [x, y] pixel value in a frame having a resolution of $x_{R1}$ by $y_{R1}$ comprises a depth value, d, representing a distance from the capture device of a surface in the three-dimensional space. Frames of photometric data $C_t$ may comprise a colour image, where each [x, y] pixel value in a frame having a resolution of $x_{R2}$ by $y_{R2}$ comprises an RGB vector [R, G, B]. As an example, the resolution of both sets of data may be 640 by 480 pixels.

Given video data representing an observation of a 3D space or scene, FIG. 2 shows an apparatus 210 for detecting objects in this video data according to an example 200. The apparatus 210 comprises an image-classifier interface 220 and a correspondence interface 230. Both interfaces 220, 230 are communicatively coupled to a semantic augmenter 240.

The image-classifier interface 220 is configured to receive 2D object-label probability distributions 250 for individual frames of video data. For example, for a given frame of video data, the image-classifier interface 220 may be configured to receive a corresponding set of one or more images, wherein pixel values in the images represent object-label probability values. An object or class label in this context comprises a given label, tag or string that identifies a particular entity. An object or class label may comprise a human-readable string, such as 'chair' or 'floor', or an identifier for data, such as a uniform resource identifier (URI) for data defining a 'chair' or 'floor' (e.g. '12345'). In a simple system with four object labels: '['door', 'floor', 'wall', 'furniture']', a set of four images may be received by the image-classifier interface 220, wherein pixel values for each image represent probability values for a respective object label; e.g. an image for 'floor' may have pixel values map-able to a 0 to 1 range, wherein each value indicates the probability that a corresponding pixel in a given frame of video data is an observation of a floor of a room. In another case, one image may be received wherein each pixel has multiple associated probability values (e.g. has an associated array), the set of probability values (e.g. the length of the array) representing the set of available object labels. In other examples, the data received at the image-classifier interface 220 may be associated with areas of a given frame of video data that differ from pixels, e.g. sets of pixels or in a simple case a single probability value for each available object label.

The correspondence interface 230 is configured to receive data 260 indicating, for a given frame of video data, a correspondence between spatial elements within the given frame and surface elements in a 3D surface element ('surfel') representation 270. For example, in one case, data 260 may comprise images wherein a pixel in the image indicates a particular surfel, if a correspondence exists, in the surfel representation 270. In another case, correspondence interface 230 may be configured to send a request to obtain a surfel associated with a given spatial element of a frame of video data, e.g. a spatial element in the form of a pixel or set of pixels. In this case data 260 may comprise a response containing an identifier or link to a particular surfel in the surfel representation 270. In FIG. 2, the correspondence between spatial element and surfel for a given frame is determined based on a projection of the surfel representation using an estimated camera pose for the frame. In certain cases, no surfel may be associated with a spatial element, e.g. if in the representation the corresponding space is blank or empty with no surfels present.

The semantic augmenter 240 of FIG. 2 is configured to, for a given frame of video data, use the data 260 from the correspondence interface 230 and the object-label probability distributions 250 from the image classifier interface to update object-label probability values 280 assigned to individual surfels in the 3D surfel representation. In particular, the semantic augmenter 240 is configured to use, for a given frame of video data, the data 260 received by the correspondence interface 230 to apply the two-dimensional object-label probability distributions 250 received by the image classifier interface 220 to object-label probability values 280 assigned to corresponding surfels.

For example, in one implementation, the 2D object-label probability distributions 250 and the correspondence data 260 may comprise 2D arrays of equivalent sizes (e.g. images of X by Y pixels, where X by Y may be common resolutions such as Video Graphics Array (VGA), Super-VGA (SVGA) or higher). The arrays may be configured to be the same size or may be appropriately re-sized or mapped. Assuming the former for this example, for each object label, a corresponding image within the object-label probability distributions 250 is first selected. Then, for each pixel, a corresponding surfel is retrieved using data 260. For example, pixel [128, 56] in data 260 may identify a surfel at a particular 3D position (e.g. [34, 135, 99]) or with a particular identifier (e.g. 'SF1234'). The existing probability value for the current object label is then retrieved for the identified surfel. This may comprise locating a data definition for a surfel having the particular identifier and updating the data definition. The existing probability value may then be updated using the current probability value at pixel [128, 56] in the image in object-label probability distributions 250 that corresponds to the given object label. This is then repeated for each pixel and for each object-label image.

In certain examples, the correspondence interface 230 is configured to provide an updated correspondence following a spatial deformation of the surfel representation 270. This may be a non-rigid spatial deformation using a deformation graph, wherein the surfels in the surfel representation form the nodes of said graph. The spatial deformation enacts a loop closure within the video data. For example, this may relate to a capture device "re-observing" a particular part of a scene or space, e.g. viewing objects that are modelled in the surfel representation a second time or from a different angle. In the present example, the semantic augmenter 240 uses the updated correspondence to update object-label probability values for a first surfel using object-label probability values for spatial elements that previously corresponded to a second surfel. In other words, following a loop closure event, the spatial deformation modifies the 3D position of the surfels meaning that in an update operation for a subsequent frame without movement of the capture device, the correspondence data 260 is different and as such different sets of surfel probability values are updated despite object-label probability distributions 250 remaining the same due to the lack of movement. In effect, the object label probability values "follow" the surfels during representation deformations. This means that predictions associated with a common object, viewed at different times or at different angles, are accurately and consistently combined. This also improves object detection accuracy. This occurs without onerous processing of the surfel representation or the probability values, and thus allows fast real-time operation.

FIG. 3A shows a schematic representation of a data structure 310 that may be used to provide a surfel representation as described above. The data structure 310 is shown for example only and should not be seen as limiting; other approaches and formats for storing data may be used depending on the implementation. In this case, the surfel model comprises data definitions for a plurality of surfels (i.e. SURFace ELements), wherein each surfel represents a 2D area (i.e. a surface) in 3D space. In certain cases, a surfel representation may comprise an unordered list of surfel data definitions. In this case, each surfel comprises at least data defining a position of the surfel in three-dimensions (i.e. a positional element or component) and data defining a normal vector for the surface element in three-dimensions (i.e. a "facing" direction for a surface associated with the element). This is shown schematically in FIG. 3B. One description of "surfels" may be found in the paper "Surfels: Surface elements as rendering primitives" by Pfister, Hanspeter, et al. as published in proceedings of the 27th annual conference on computer graphics and interactive techniques, ACM Press/Addison-Wesley Publishing Co., in July 2000.

FIG. 3B shows a schematic representation of a surface element or "surfel" 320. The surfel 320 comprises a surface, s, in three-dimensions. The surfel has a position, p, in three dimensions. In FIG. 3A this position is defined using a three-dimensional co-ordinate, e.g. the data "Position: $p_x$, $p_y$, $p_z$;" defining x, y and z co-ordinates. In other examples other co-ordinate systems may be used. In FIG. 3B the surfel also has a normal vector, n, that is defined within three-dimensions. In FIG. 3A this position is defined using a three-dimensional vector, e.g. the data "Normal: $n_x$, $n_y$, $n_z$;". Direction may be indicated using signed values within the vector definition.

The example 310 in FIG. 3A also shows object-label probability values that are assigned to each surfel. In the present example, the probabilities ("Probabilities: {$P_{O1}$, $P_{O2}$, ..., $P_{On}$}" where $O_n$ represents the object label for an nth object) are stored together with the surfel definition. In other cases, the probabilities may be stored in a separate look-up table or database record that is associated with the surfel via a surfel identifier or foreign key. In the above simple case with four object labels (['door', 'floor', 'wall', 'furniture'], these probability values may be [0.1, 0.2, 0.2, 0.5], indicating a surfel is likely associated with furniture in a room.

The example 310 in FIG. 3A also has further data that may be used, in certain examples, to describe the surfel. In the present case, the surface of the surfel is a circle or disc in 3D space. As such, the surface in FIGS. 3A and 3B is defined by a radius, r, as set out as data "Radius: r;". The radius of each surfel is intended to represent the local surface area around a given point while minimising visible holes. In other examples, different data may be used to define the surface, e.g. using different geometric definitions and/or variables indicating the extent of the surface within three-dimensions. FIG. 3A shows that, in the present example, the surfel definition also comprises data defining: a colour of the surface ("Colour: R, G, B;"—in this case an RGB colour space is used but any known colour space is possible); a weight for the surfel ("Weight: w;"—this may be a real number that is used when fusing new measurements with the surfel); an initialisation time ("Init_Time: t0;") indicative of a time the surfel was first generated; and a last modified time ("Last_Modified: t;) indicative of a time when the surfel was last updated or modified. It should be appreciated that data defining attributes of a surfel may be added, modified or omitted depending on the implementation. As shown in FIG. 3A, multiple surfels may be defined in the list (e.g. between "{ . . . }" in the example).

Figure 4:
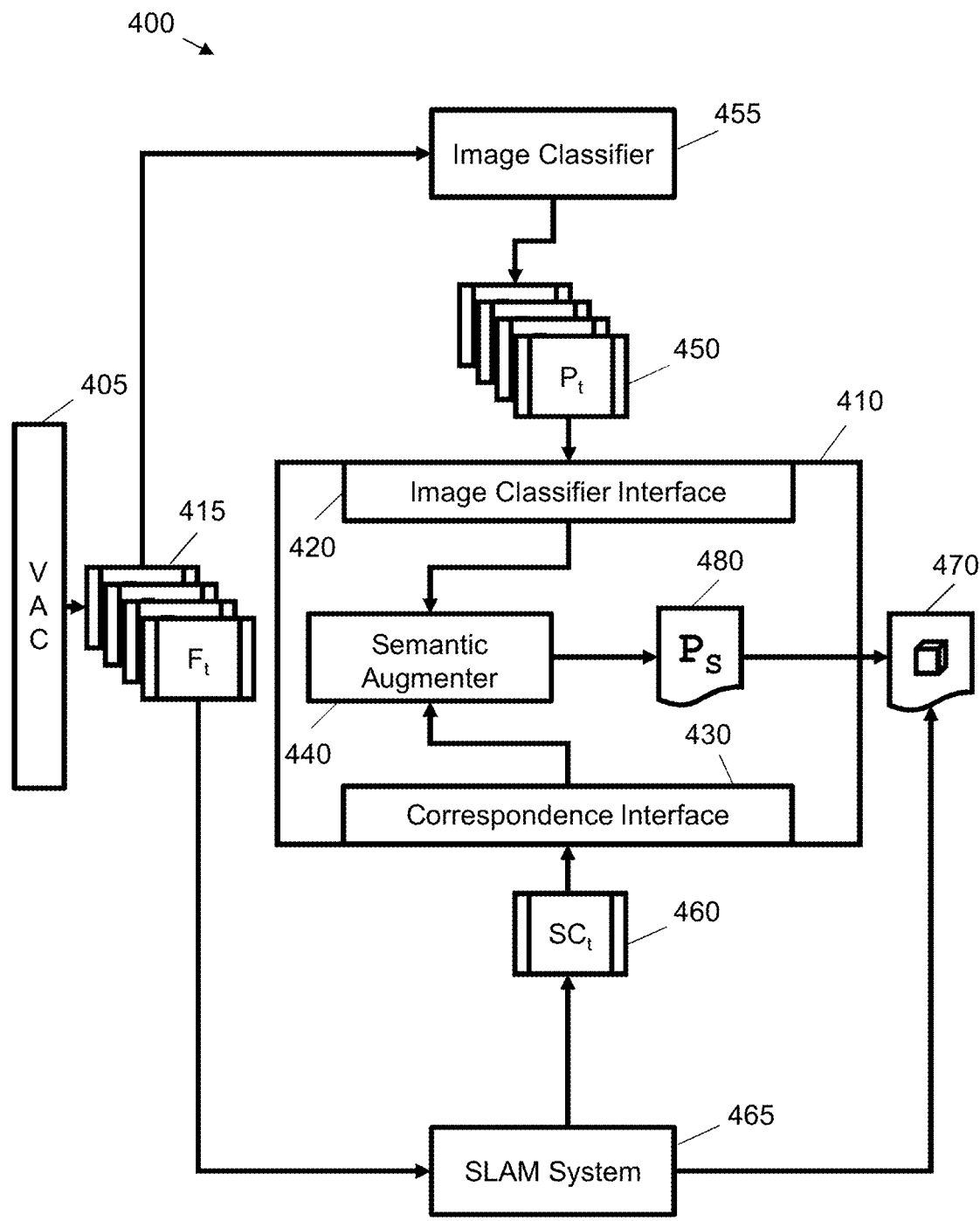
FIG. 4 is a schematic diagram of a video processing system for detecting objects present in video data according to an example.

FIG. 4 shows an example of a video processing system that may use the apparatus 210 shown in FIG. 2. In FIG. 4, entities 410 to 480 correspond to entities 210 to 280 described with reference to FIG. 2. FIG. 4 further shows a video acquisition interface 405. The video acquisition interface 405 is configured to obtain frames of video data 415 from a capture device. This may be video data that is actively, or has been previously, been generated by a capture device, such as capture device 165 in FIG. 1C. The frames of video data 415 feature relative movement that has occurred between the capture device and a 3D space or scene over time.

The video acquisition interface 405 in FIG. 4 is communicatively coupled to an image classifier 455 and a Simultaneous Location And Mapping (SLAM) system 465. Both the image classifier 455 and the SLAM system 465 are configured to receive frames of video data 415. In certain cases, the image classifier 455 and the SLAM system 465 may receive the same frames of video data. In other cases, the image classifier 455 may receive a subset of the frames of video data that are received by the SLAM system 465. In this case, the SLAM system 465 provides correspondences between frames 460 and a globally consistent map of fused surfels 470. The semantic augmenter 440 operates as described with reference to FIG. 2, in that it fuses probabilities 450 received from the image classifier interface 420 with existing surfel probability distributions to generate a set of object or class probabilities 480 for each surfel in the 3D representation 470. In this case, appropriate surfels are selected according to correspondence data 460 received via the correspondence interface 430.

The image classifier 455 comprises a two-dimensional image classifier communicatively coupled to the image-classifier interface 420 to compute object-label probability distributions 450 for frames of the video data 415 obtained from the video acquisition interface 405. In certain cases, the frames of video data 415 may be rescaled to a native resolution of the image classifier 455. For example, frames of video data 415 may be rescaled to a 224 by 224 resolution using bilinear interpolation for RGB pixel values. In certain cases, an output of the image classifier 455 may also be rescaled to match a resolution of the correspondence data 460. For example, an output of the image classifier 455 may be rescaled to a 640 by 480 image resolution using a nearest neighbour upscaling method.

The image classifier 455 may implement at least one of a variety of machine learning methods. It may use, amongst others, support vector machines (SVMs), Bayesian networks, Random Forests, nearest neighbour clustering and/or neural networks. In certain examples, the image classifier 455 may comprise a convolutional neural network (CNN). The CNN may have multiple convolution layers (e.g. 16 in one example), sometimes informally referred to as a "deep learning" approach. In one case, the CNN is configured to output the object-label probability values as a set of pixel maps (e.g. images) for each frame of video data. This may be achieved by communicatively coupling a deconvolutional neural network to the output of the CNN. Further details of an example CNN featuring deconvolution layers may be found in the paper by H. Noh, S. Hong, B. Han on Learning deconvolution network for semantic segmentation (see arXiv preprint arXiv:1505.04366-2015). The image classifier 455 may thus be configured to output a dense pixel-wise semantic probability map following suitable training. Example test operating parameters for a CNN image classifier 455 comprise a learning rate of 0.01, momentum of 0.9 and weight decay of $5 \times 10^{-4}$. In this case after 10,000 iterations the learning rate was reduced to $1 \times 10^{-3}$, wherein training took 20,000 iterations. In this test example, original CNN weights were first pre-trained on a dataset of images associated with a general image classification task. The weights were then fine-tuned for a scene-segmentation task associated with the present 3D semantic-labelling. One or more graphics processing units may be used to train and/or implement the image classifier 455.

In one case, the image classifier 455 receives frames of video data 415 in the form of successive photometric (e.g. RGB) images, such as photometric data 185 in FIG. 1C. In certain examples, the image classifier 455 is adapted to receive depth data as well as, or instead of, photometric data, e.g. depth images such as 180 in FIG. 1C. As such, the image classifier 455 may comprise four input channels corresponding to each of RGB-D data. In one case, the depth channel of the image classifier 455 is initialized with the average intensity of the three photometric channels. In this case, a 0-255 value colour range may be converted to a 0-8 m depth range by increasing the weights used by the image classifier 455 (e.g. by around 32 times). In another case, as well as or instead of any one of RGB-D data, the image classifier 455 may be adapted to use surfel normal values as input data. For example, an input image may comprise a projection of the 3D surfel representation onto a 2D image plane using a current estimated pose for a capture device, wherein each pixel value in the image comprises a normal value of a projected surfel. In this case, the correspondence data 460 may include normal data and may be configured as input for the image classifier 455.

The image classifier 455 may be trained using one or more labelled datasets, i.e. frames of video data where object labels have been pre-assigned. For example, one such dataset comprises the NYU Depth Dataset V2 as discussed by N. Silberman et al. in Indoor Segmentation and Support Inference from RGBD Images published in ECCV 2012. The number of object or class labels may depend on the application. One test case featured 13 class labels.

In cases where a CNN is used, the network may comprise layers of learned image filters or kernels. At the lowest layers these filters may correspond to simple edge and blob detectors (e.g. 3×3 matrices), which when convolved with a small patch of an input image results in a large activation if the image patch contains a 'matching' edge in terms of orientation, or a matching blob of colour. In this case, convolution refers to an elementwise multiplication and sum. In certain cases, the convolution operation may be approximated using a cross-correlation calculation. Following convolution, activations are input into a non-linear activation function. In one example, a Rectified Linear Unit or ReLU may be used (e.g. output=max(input,0)). Following this, further layers of filters are applied with each subsequent layer building to higher level of abstractions, such as combinations of edges to build complex shapes or textures. A procedure known as 'max pooling' may also be applied where only the highest activations within a small neighbourhood are selected and passed to the next layer. The result of this CNN processing is a downsampled image. The location of the pooled activations may then be stored. After further convolutional operations, a similar process may be performed 'in reverse', with 'unpooled' activations being set to the original stored location and deconvolutional filters 'painting' activations back into an upscaled multi-channel feature map. Finally, a set of scores for each class for each pixel in the original image are calculated, at the same scale as the original input image. This score is converted into a probability map by applying a softmax function across the classes for each pixel. This whole neural network may be trained end-to-end on a large set of training images to minimise the total negative log probability of the correct class over all pixels.

Returning to FIG. 4, the SLAM system 465 may comprise a SLAM system such as that described in International Patent Application PCT/GB2016/051423. The SLAM system 465 is configured to generate the surfel representation 470 based on the frames of video data 415. The SLAM system 465 may be configured to apply a spatial deformation to the surfel representation 470 to close loops of observation within the frames of video data 415. This spatial deformation results in new three-dimensional position for at least one surfel in the surfel representation. As described above, and in more detail below, a non-rigid spatial deformation may be applied using a deformation graph. In this case the SLAM system 465 does not require a pose graph to construct a globally consistent surfel representation. This SLAM system 465 is particularly suited for use with the semantic augmenter 440 because the generated surfel representation 470 is automatically deformed to remain consistent after one or more of small and large loop closures that frequently occur during typical interactive use. As the surface representation is deformed and corrected during operation, individual surfels remain persistently associated with real-world entities and this enables long-term fusion of per-frame semantic predictions over wide changes in viewpoint.

Figure 5:
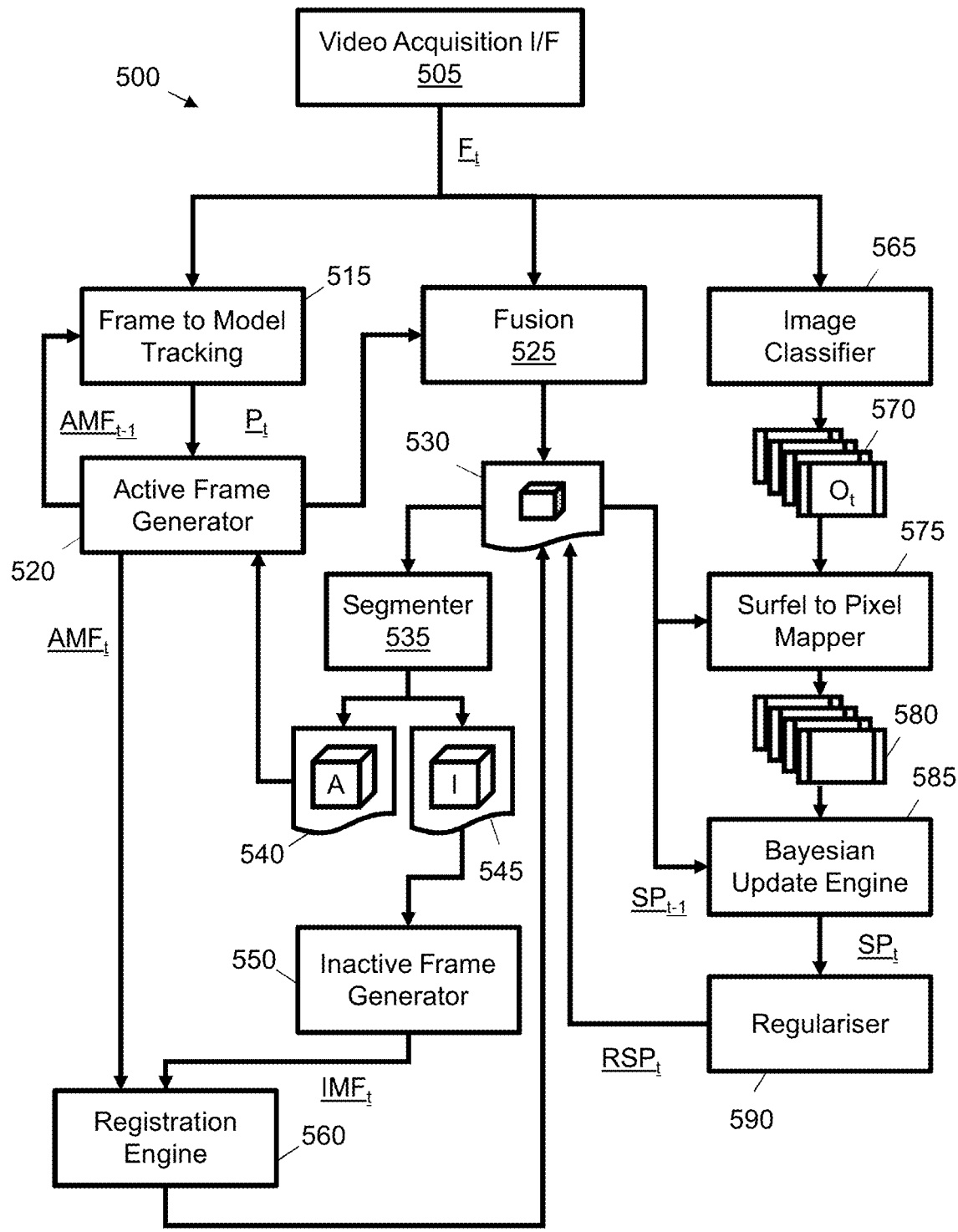
FIG. 5 is a schematic diagram showing an example pipeline for semantically labelling a surface element representation based on frames of video data.

FIG. 5 shows an example process flow or pipeline 500 that may be applied to a frame of video data. This process flow illustrates how components of a SLAM system, such as SLAM system 465, work in unison with an apparatus for detecting objects, such as 210 or 410, to generate a semantically labelled 3D representation or map of an observed 3D space.

In the example of FIG. 5, for each arriving frame, $F_t$, a pose of a capture device such as a camera is tracked. This may be performed using a combination of Iterative Closest Point (ICP) and photometric (e.g. RGB) alignment. This tracking may yield a new pose, $P_t$, for each frame, the pose being defined with reference to a "world" frame and a "capture device" frame. New surfels are then added to the surfel representation using the pose, and existing surfel information is combined with new evidence to refine surfel definitions, e.g. positions, normals, and colour information. Additional checks for a loop closure event run in parallel and the surfel representation is optimised upon a loop closure detection.

In more detail, in FIG. 5, components of both a SLAM system and a semantic augmenter are communicatively coupled to a video acquisition interface 505. This may comprise video acquisition interface 405 from FIG. 4. In the Figure, the video acquisition interface 505 supplies frames of video data Ft (where t may comprise a time index).

The SLAM system components shown in FIG. 5 comprise a frame-to-model tracking component 515, an active frame generator 520, a model fusion component 525, a model segmenter 535, an inactive frame generator 550 and a registration engine 560. These components are configured to work together to generate a 3D surfel representation 530, which may be of a form as illustrated in FIGS. 3A and 3B. FIG. 5 also shows an image classifier 565, a surfel-to-pixel mapper 575, a Bayesian update engine 585 and a regulariser 590. In this case the Bayesian update engine 585 forms the core of the apparatus for detecting objects. The apparatus for detecting objects is arranged to semantically label the surfel representation 530, e.g. to assign object-label probabilities to surfels as shown in FIG. 3A. In the present example, these are assumed to be stored with the surfel representation 530; in other implementations they may be stored in separate surfel-linked data stores.

The frame-to-model tracking component 515, the model fusion component 525 and the image classifier 565 are each arranged to receive a frame of video data, $F_t$, from the video acquisition interface 505. This data may be retrieved from a time-indexed data structure representing captured or previously-recorded video data and/or may be supplied as part of a live video feed, in each case the data relates to a frame currently provided by at least one capture device. As described above, in one implementation the image classifier 565 may receive one of every n frames received from the video acquisition interface 505, i.e. a subset of the frames received by the frame-to-model tracking component 515 and the model fusion component 525. In one case this may be one in every $2^n$ frames.

In one case, as described in International Patent Application PCT/GB2016/051423, the segmenter 535 is configured to segment the surfel representation 530 into at least active and inactive portions based on at least one representation property. The at least one representation property may comprise one or more of: a created time for a given surfel, a last modified time for a given surfel, and a determined distance between a surfel and a capture device. For example, a surfel may be declared as inactive when the time since that surfel was last updated or modified (e.g. had a raw image data value associated with it for data fusion) is greater than a predefined $\delta_t$. Active portions of the surfel representation 530 are used to update the representation when new frames of video data are received. For example, as shown in FIG. 5, the frame-to-model tracking component 515 is communicatively coupled to an active model frame generator 520. The active model frame generator 520 is configured to compute an active model frame from active portions 540 of the surfel representation 530. The frame-to-model tracking component 515 is then configured to compare an active model frame received from the active model frame generator 520 to a frame of image data received from the video acquisition interface 505. The model fusion component 525 is configured to update the surfel representation 530 based on a frame of image data received from the image acquisition interface 505 and data from the active model frame generator 520. The inactive portions 545 are not used by the active model frame generator 520 and the model fusion component 525. In a case wherein surfel representation 530 comprises an unordered list of surfels, portions 540 and 545 may comprise filtered versions of the unordered list.

The active model frame generator 520 may be configured to generate an active model frame based on a projection from the active portions 540 of the surfel representation. In FIG. 5, the active model frame generated by the active model frame generator 520 for a time t−1, $AMF_{t-1}$, is received by the frame-to-model tracking component 515, together with the frame of video data for a time t, $F_t$, and is used to generate a pose estimate, $P_t$, for a capture device deemed to generate the frame of video data at the time t. As discussed previously, this may represent an actual location and orientation of a capture device or a device to which the capture device is statically mounted, or it may present a deemed virtual capture device. The pose estimate may comprise variable values for the six degrees of freedom shown in FIG. 1B. The active model frame, $AMF_{t-1}$, may comprise predicted frames, at a time t−1, of depth data, $\hat{D}_{t-1}{}^a$, and of photometric data, $\hat{C}_{t-1}{}^a$.

The pose estimate at time t, $P_t$, is communicated from the frame-to-model tracking component 515 to the active model frame generator 520. The active model frame generator 520 is configured to use the pose estimate at time t, $P_t$, to determine an active model frame at time t, $AMF_t$. This may comprise using the variable values of the pose estimate to determine a projection geometry using active surfels 340.

In one case, the frame-to-model tracking component 515 may be configured to compare each of the predicted frames of depth and colour data at time t−1, $\hat{D}_{t-1}{}^a$ and $\hat{C}_{t-1}{}^a$, to frames of video data for time t, $D_t^{ID}$ and $C_t^{ID}$. This comparison may comprise determining, for each pair of frames (i.e. for the depth data pair and the colour data pair), motion parameters that minimise an error function between the frames in each pair. A tracking error may then be defined as the sum of the depth data error and the photometric data error. This sum may be a weighted sum. In one case, the photometric data error may be multiplied by a weighting factor, e.g. to reduce its contribution with reference to the depth data error. This factor may be 0.1 in one case. A least squares function may be used to yield an estimate of the variable values for the degrees of freedom. This estimate may be used to determine a transformation that maps a pose estimate at time t−1, $P_{t-1}$, to a current pose estimate, $P_t$. This current pose estimate may be used to align the video data, $F_t$, with the active portions 540. It may be used by the model fusion component 525 to fuse the frame of video data, $F_t$, with the active portions 540.

As well as active model frame generator 520, the example 500 of FIG. 5 further comprises an inactive model frame generator 550. The inactive model frame generator 550 is similar to the active model frame generator 520 but is configured to generate an inactive model frame, $IMF_t$, from the inactive portions 545 of the surfel representation 530. For example, an inactive model frame may be computed by the inactive model frame generator 550 based on a geometric projection from the inactive portions 545. In one case, the active model frame generator 520 and the inactive model frame generator 550 may be implemented by a common frame generator that is configured to receive active and inactive portions of the model as differentiated inputs in order to respectively generate active and inactive model frames. As described with reference to the active model frames, each inactive model frame may comprise a predicted frame of depth data, $\hat{D}_t^i$, and a predicted frame of photometric data, $\hat{C}_t^i$.

The registration engine 560 in FIG. 5 is configured to align active portions 540 of the 3D surfel representation with inactive portions 545 of the 3D surfel representation over time. In FIG. 5, the registration engine 560 is arranged to receive an active model frame, $AMF_t$, from the active model frame generator 520 and an inactive model frame, $IMF_t$, from the inactive model frame generator 550. In the present example, the registration engine 560 is configured to compare these two frames to determine a transformation that aligns the active model frame with the inactive model frame. As shown by the arrow in FIG. 5, this transformation may then be used to update the surfel representation 530 to bring the active and inactive portions of the model into alignment. This transformation may be used to apply a non-rigid spatial deformation to surfels for both the active and inactive portions. In one case, the deformation may be applied using a deformation graph. This is described in more detail with reference to FIG. 7. The deformation or alignment may make use of the current pose estimate $P_t$. In certain cases, the registration of active and inactive model frames may use a process similar to that of the frame-to-model component 515. For example, rather than attempting to align a previous predicted frame with a frame of newly-received image data, the registration engine 560 is configured to determine a transformation, $H_t$, that aligns the active and inactive frames. If alignment is performed, the registration engine 560 may set all visible inactive surfels, e.g. those visible in the inactive model frame, to be active.

In parallel with the operation of components 515 to 560, the image classifier 565 is configured to receive a frame of video data, $F_t$, and compute a set of object-label probability distributions 570. In this case, as described above, the object-label probability distributions 570 are provided as a set of images, each image corresponding to a different object label, wherein spatial element values, in this case pixel values, in the images represent a probability that an object having the label is visible in the spatial element. In FIG. 5, the set of object-label probability distributions 570 are received by a surfel-to-pixel mapper 575. In this example, the surfel-to-pixel mapper 575 is configured to determine a correspondence between a spatial element (e.g. a pixel) in the images 570 and a surfel in the surfel representation 530. This correspondence is based on the tracked pose, $P_t$, which may be stored with the surfel representation 530 or supplied by the frame-to-model tracking component 515. Using the tracked pose, $P_t$, each surfel at a given 3D location $_W x(s)$ in the surfel representation 530 may be associated with pixel coordinates u associated with a frame $F_t$ via the camera projection $u(s, t) = \pi(_{CW}P_{tW}x(s))$, where $_{CW}P_t$ is the pose of the capture device ("C") with respect to the "world" ("W") of the 3D representation which is calculated employing the homogeneous transformation matrix $_{CW}P_t = {}_{WC}P_t^{-1}$ (where $_{WC}P_t$ is the pose $P_t$ of the "world" with respect to the capture device) and using homogeneous 3D coordinates. In one implementation, the result of this projection may be provided as an image of correspondences, wherein each pixel value has an associated identified surfel from the surfel representation 530. The surfel-to-pixel mapper 575 is then able to map input probability values from data 570 with surfels based on a pixel correspondence, e.g. pixel [256, 34] from the frame of video data $F_t$ is determined to be associated with surfel "SF1234" based on the projection, and hence probability values associated with the same pixel from the image classifier 565 are associated with surfel "SF1234". In a simple case, pixel correspondences may be one-to-one, e.g. the frames of video data $F_t$, the images comprising the probability values 570, and an image indicating surfel correspondences all are provided at a common resolution (e.g. 640 by 480). In other cases, the images may have different resolutions with known scaling; as such the pixel correspondences may be mapped based on the known scaling. In one case, if no a priori evidence is available, newly generated surfel are initialised with a uniform distribution over the available object labels.

In FIG. 5, once a set of object-label probability values 580 have been assigned to surfels deemed visible in a frame of video data they are sent to the Bayesian update engine 585. For example, the surfel-to-pixel mapper 575 may be configured to output a set of surfel-probability pairings, identifying a given surfel (e.g. "SF1234") and the corresponding probability values from the image classifier 565. The Bayesian update engine 585 is configured to retrieve existing object-label probability values, $SP_{t-1}$, for surfels identified in the data 580 and to use the new probability values in data 580 to update these existing values. For example, Bayesian update engine 585 may be configured to update all the surfels in a visible set from the surfel representation 530 with a corresponding probability distribution by means of a recursive Bayesian update. The Bayesian update may comprise:

$$P(L_s = l_i \mid F_{1,\ldots,t}) = \frac{1}{z} P(L_s = l_i \mid F_{1,\ldots,t-1}) P(O_{u(s,t)} = l_i \mid F_t)$$

where $L_s$ is an object label for a surfel s, $l_i$ is a given object label in the set of possible object labels, $O_{u(s,t)}$ is the probability value from the image classifier, F identifies the frames of video data and Z is a normalising constant to yield a proper distribution. This update may be applied to all label probabilities per surfel.

In a simple implementation, the Bayesian update engine 585 may be configured as follows. For each pixel in an image representing projected surfel identifiers, a previous set of probabilities ($SP_{t-1}$) for the corresponding surfel is first retrieved. The corresponding predictions 570 from the image classifier 565 are then loaded. If the image classifier 565 outputs a different size to the projected surfel image, the pixel location may be remapped in terms of height and width to a normalized real value between 0 and 1, where the floor of that value multiplied by the classifiers output size may be used to select an appropriate set of probabilities. For each class (e.g. object name), the stored probability for that class is multiplied by the new predicted probability for that class, and the total of these multiplied values over the entire set of classes is cumulated. After all classes have been updated, the total (i.e. the cumulated probability) may be used to normalise each probability (e.g. by dividing by the total).

In certain cases, Bayesian update engine 585 may be implemented using at least one graphics processing unit (GPU). In these cases, processing may be parallelized. In this case, an ordering scheme may be applied for surfels with multiple corresponding pixels in data 580.

The update applied by the Bayesian update engine 585 is possible due to the surfel correspondences computed by the surfel-to-pixel mapper 575. This enables object label hypotheses from multiple frames of video data to be combined in a Bayesian manner. In certain cases, updates to probability values and/or the application of image classifier 565 may be delayed for a predetermined number of frames to leave time to properly initialise the system and generate an appropriate set of surfels within the surfel representation 530. The output of Bayesian update engine 585 is an updated set of surfel probability values, $SP_t$, representing probabilities that a given surfel should be assigned one of a set of available object labels following the most recent frame $F_t$ (i.e. the newest evidence).

In one implementation, the set of updated surfel probability values, $SP_t$, may be used to update the surfel representation 530. In certain implementations, as shown in a FIG. 5, a regulariser 590 may be applied to the updated surfel probability values, $SP_t$, to generate a set of regularised surfel probability values, $RSP_t$, before the surfel representation 530 is updated. Regularisation may be useful in certain cases to propagate semantic information spatially within the surfel representation. However, it may not be required in all cases. Regulariser 590 may apply the regularisation based on one or more of: surfel positions, surfel colours, and surfel normals.

In one implementation, the regulariser 590 may apply a conditional random field (CRF) to the object-label probability values $SP_t$. In one case, a fully-connected CRF may be applied with Gaussian edge potentials. In this case, each surfel may be treated as a node in the CRF graph. Rather than using the CRF to arrive at a final prediction for each surfel it may simply be used to incrementally refine predictions from the Bayesian update engine 585.

The example pipeline 500 shown in FIG. 5 is configured to operate on a frame-by-frame basis in real-time (e.g. for frames of 640 by 480 resolution). As such, as new video data is received (e.g. for every frame or every n frames) the object-labels and the surfel representation are updated to provide a globally consistent and semantically labelled representation. The SLAM system, the surfel-based representation and the semantic augmentation work synergistically, allow probability distributions to be "carried along" with the surfels during loop closure, and also fusing new depth readings to update depth and normal information for a given surfel, without destroying the surfel, or its underlying probability distribution. A Bayesian update scheme keeps track of the object label probability distribution for each surfel, and uses the correspondences provided by the SLAM system to update those probabilities based on the image classifiers predictions. As the pipeline operates at real-time frame-rates it can be used both interactively in human and robotic applications. Moreover, the pipeline is specifically suited to processing variable scene observations; indeed, in tests these forms of observations were surprisingly seen to increase object detection accuracy.

Figure 6:
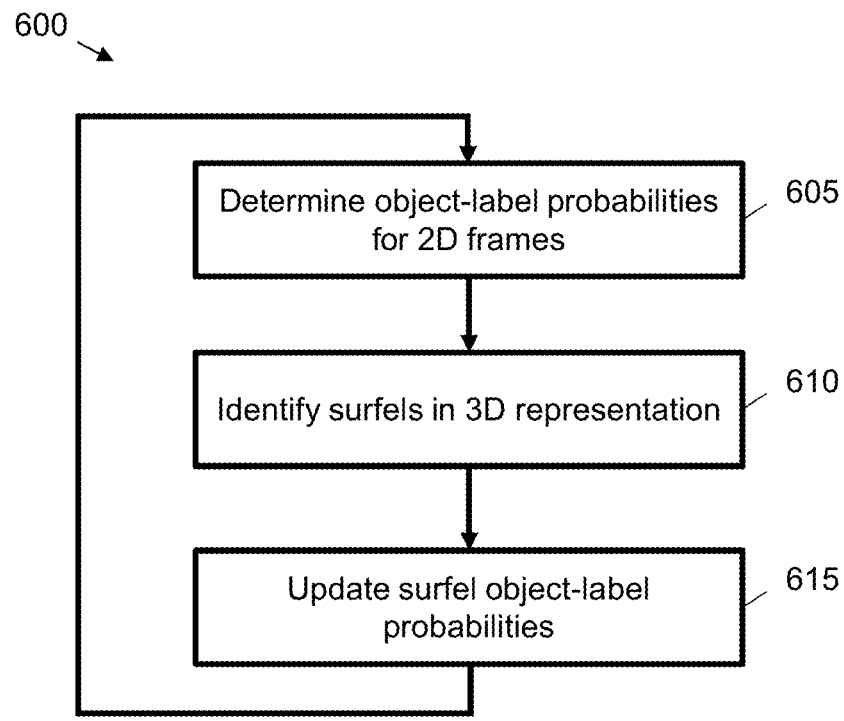
FIG. 6 is a flow diagram showing a method for detecting objects in video data according to an example.

FIG. 6 shows a method 600 for detecting objects in video data according to an example. This method 600 may be implemented using the examples 200, 400, and 500 as described with reference to FIGS. 2, 4 and 5.

At block 605, object-label probability values for spatial elements of frames of video data are determined using a two-dimensional image classifier. For example, the two-dimensional image classifier may be a CNN as described above that is configured to receive a frame of video data as a 2D image and to output probability values for at least one area of the 2D image. In this case, the probability values relate to a plurality of available object or class labels, e.g. string labels representing words and/or identifiers for object data definitions. In one case, probability values may be output for each pixel of an input 2D image and this output may be structured as one or more images, wherein in certain cases each image comprises a probability distribution for a particular object label. These output images can be referred to as "pixel maps". This may be the case where the two-dimensional image classifier comprises a deconvolutional neural network communicatively coupled to an output of a CNN. The two-dimensional image classifier may be configured to compute object-label probability values based on at least colour data and depth data for a frame.

At block 610, surfels in a 3D surfel representation or model of a space that correspond to the spatial elements are identified. The correspondence in this case between a spatial element and a surfel is determined based on a projection of the surfel representation using an estimated pose for a frame, e.g. a project of a surfel model onto a 2D plane from the viewpoint of the current estimated pose for the frame. As described with reference to FIGS. 4 and 5, the surfel representation may be generated by processing frames of video data, including, on a frame-by-frame basis: comparing a rendered frame generated using the 3D surfel representation with a video data frame from the frames of video data to determine a pose of a capture device for the video data frame and updating the 3D surfel representation using the pose and image data from the video data frame. In one case, a subset of the frames of video data used to generate the three-dimensional surface element representation are input to the two-dimensional image classifier.

At block 615 in FIG. 6, object-label probability values for the surfels in the 3D surfel representation are updated based on the object-label probability values for corresponding spatial elements. This results in a semantically-labelled 3D surfel representation of objects present in the video data. For example, an estimate representing objects present in the video data may be generated by taking the highest probability value in the set of object label probability values for each surfel (e.g. using a maximum likelihood approach).

Blocks 605, 610 and 615 are repeated iteratively, e.g. on a frame-by-frame basis, as new video data is received (e.g. either from a live video feed or a recording). As such, object-label probability values are continually updated. Object-label probability distributions may thus start having initialised uniform values and then converge on a ground truth for a scene. Moreover, the method is able to adapt to changes in the make-up of a space or a scene, e.g. objects arriving or leaving the scene or interactions with the scene.

Returning to FIG. 6, during the repetition of blocks 605, 610 and 615, i.e. during processing of video data, the method may further comprise detecting a loop closure event. A loop closure event occurs when surfels generated from newly received video data are determined to be misaligned with surfels that correspond to the same region of the three-dimensional space that were previously generated and/or modified based on previously-processed video data. For example, when a capture device completes a motion loop, e.g. returns to view a region of the space that was previously observed, previous portions of the surfel representation may be out of alignment with newer portions of the surfel representation. This misalignment or "drift" in the surfel representation occurs as the generation of the representation uses estimates and seeks to minimise error functions, e.g. operates non-deterministically, such that small errors in the pose estimate and the representation may accrue as the model is generated. Additionally, the surfel representation is constructed without requiring a pose-graph, wherein a pose-graph is typically continually optimised to reduce errors. An example pipeline for detecting and enacting a loop closure event is described later with reference to FIG. 7. In one case, a continuous attempt is made, e.g. for each frame, to register active portions of the surfel representation within a current estimated capture device (i.e. active model) frame with the inactive portions of the surfel representation within the same frame.

If a loop closure event is detected and alignment is possible, e.g. based on an alignment metric or level of deformation that is required, a spatial deformation may be applied to the surfel representation, wherein the spatial deformation modifies three-dimensional positions of surfels in the representation. In certain cases, this spatial deformation acts to align newer active portions of the surfel representation to the older inactive portions, wherein the entire 3D surfel representation may be non-rigidly deformed into place to reflect this registration. By incorporating many small local model-to-model loop closures in conjunction with larger scale global loop closures it is possible to stay close to a mode of a probability distribution of the surfel representation and produce globally consistent reconstructions in real-time without the use of pose graph optimisation or post-processing steps. The use of frequent non-rigid model deformations, e.g. on a frame-by-frame basis, improves both the trajectory estimate of the capture device and the surface reconstruction quality. This approach is also effective in both long scale "corridor-like" camera motions and more loopy comprehensive room scanning trajectories.

When surfels are deformed, the new deformed surfel representation is used in subsequent repetitions of blocks 605, 610 and 615. This has an effect of, in a case where all other parameters are kept constant, of modifying the correspondence between spatial elements of classified video frames and surfels. For example, if a capture device is held static and views an area of a scene such that a pose remains constant, before a loop closure event pixels representing this view will be associated with a first set of surfels in the surfel representation but after the loop closure event the same pixels will be associated with a second, different, set of surfels. As each surfel has an assigned set of object-label probability values, this means that image classifier output for those pixels will be used to update a different set of object-label probability values following the loop closure event. A loop closure event acts to "snap" surfels that have previously drifted apart together, such that there is a consistent relationship between model surfels and surfaces in the actual observed space. In the present method, the loop closure event also acts to "snap" together object-label probabilities for those surfels, e.g. such that a pixel classifications relating to a 'chair' are consistently used to update surfels having surfaces that form part of the chair. This leads to accurate classifications. Surprisingly, whereas comparative methods of object classification degrade in the presence of loop closure events (as resource-intensive heuristics are required to process the differing sets of probability values that have drifted apart), the present method actually improves accuracy, as "choppy" or "loopy" video sequences comprise multiple views of an object whose classifications are consistently merged within the surfel model. For example, walking around an object such as a bed or table will result in video data having views of the object from multiple angles. Due to the non-deterministic nature of computer vision, with comparative point-cloud approaches, this results in a number of separate 3D points with associated object-label probability values. There is then a problem of how to combine such points into a globally consistent model with semantic labelling. With the present methods, deformations, surfels, and iterative frame-based updates result in a limited number of surfels representing an object and probabilities from different views being consistently applied to the same surfels.

In certain cases, the method may comprise a further block of replacing a set of one or more surfels with a 3D object definition based on the object-label probability values assigned to the surfel. For example, if a set of surfels within a predetermined distance of each other have a "table" object label probability above 70% then these surfels may be replaced with a 3D representation of a table, the dimensions of the table being set by fitting a predefined object shape to the positions of the surfels.

In certain cases, the method may comprise regularising the object-label probability values for the surface elements after block 615. This may involve applying a CRF as described above and/or regularising object-label probability values assigned to surfels based on one or more of: position data, colour data and normal data.

In one case, a training set of images for the image classifier may be generated by annotating a surfel representation, e.g. one previously produced by a SLAM system. In this case, surfels in an existing representation may be annotated with object-labels to provide an annotated representation. A projection of the representation may then be made for each frame of video data that was previously used to generate the representation, wherein the projection projects the annotated labels onto a 2D image such that each pixel has an object label. The image classifier may then be trained using the 2D images.

Further detail on an example loop closure method will now be described with reference to FIG. 7.

Figure 7:
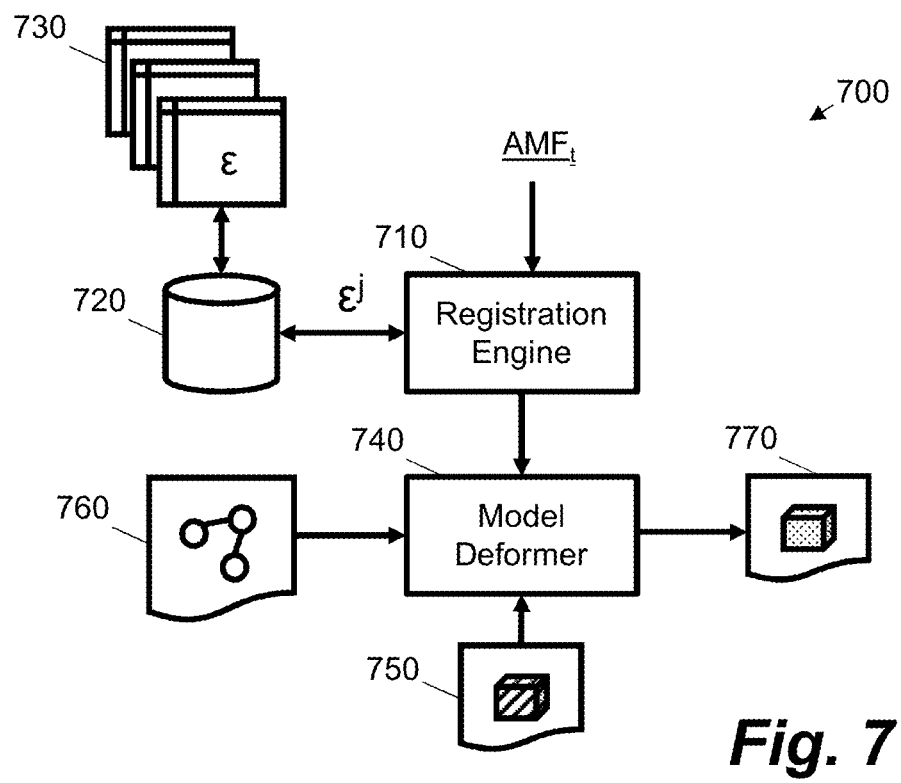
FIG. 7 is a schematic diagram showing an example process flow for registering portions of a surface element representation and applying a deformation graph.

FIG. 7 shows an example 700 of components that may be provided in addition to those shown in FIG. 5. In FIG. 7 the registration engine 710, which may have the same functionality as previously-described registration engines 560, is communicatively coupled to a data storage device 720. The data storage device 720 stores encodings 730 ("ε") of a surfel model (e.g. 530) over time. These encodings 730 may represent encodings of active model frames, $AMF_t$, as they are generated; e.g. may comprise an encoding of depth data, $\hat{D}_t^a$, and of photometric data, $\hat{C}_t^a$. In one case the encoding may be a compressed and/or down-sampled version of an active model frame. Parts of predicted views in an active model frame that are devoid of any mapped surface may be filled, in certain cases, using a current frame from the video data. In certain cases, the encoding may comprise a fern-encoding of an active model frame. Fern encoding is described in the paper Realtime RGB-D camera relocalization via randomized ferns for keyframe encoding by B. Glocker, J. Shotton, A. Criminisi, and S. Izadi, TVCG, September 2014. Ferns encode an RGB-D image as a string of codes made up of the values of binary tests on each of the RGB-D channels in a set of fixed pixel locations. The present example differs from the paper in that predicted views, as opposed to image data are stored. Each encoding may comprise data associated with one or more of: a fern encoding string; a downsampled predicted frame of depth data; a downsampled predicted frame of photometric data; a current pose estimate; and an initialisation time for the encoding. A downsampled frame size, e.g. 80×60 may be used.

In the example of FIG. 7, an active model frame, $AMF_t$, is received by the registration engine 710. An attempt is then made to match the active model frame, $AMF_t$, with one of the encodings 730 in the data storage device 720. For example, a new encoding may be generated from the received active model frame $AMF_t$ and compared with the encodings 730 stored in the data storage device 720, e.g. the match may be performed using the fern encodings. A match may be indicated by an output of a comparison function, e.g. an error or match imaging metric may indicate a degree of similarity between compared frames or encodings. For example, a comparison may be made between fern-encodings. In this case the fern-encoding may comprise a binary code, wherein two images may be compared by summing a "distance" between two binary codes. A smallest distance is deemed to be the "best" match, wherein the distance may be compared to a threshold to determine whether the match is "good". The active model frame, $AMF_t$, may be down-sampled to perform the matching, e.g. a fern-encoding may be made on a downsampled frame. In this case, a metric value indicating a best match (e.g. a lowest value of an imaging metric indicating a difference or error) may be used to indicate a matching stored encoding $ε^j$. The stored encoding, as well as having data that is used for the matching (e.g.

a fern-encoding) may also comprise an encoding of a model frame, e.g. $ε_D^j$ and $ε_C^j$. In one case, a imaging metric value for a best match may further be compared with a predefined threshold to determine if the match is valid. For example, even a "best" match may be a poor actual match, e.g. have a high match error; the threshold comparison thus avoids the use of these poor matches. Downsampling may be used by the registration engine 710 as if a relatively "coarse" match is found and is correct, then subsequent active and inactive model frames will be close enough to enable alignment as performed in FIG. 5, e.g. they will align enough following a "global" loop closure such that a more precise "local" loop closure is possible.

In one case, if no match is found, e.g. if a matching imaging metric is above a given error threshold, then registration of the active model frame, $AMF_t$, and an inactive model frame is performed, e.g. as shown in FIG. 5. On the other hand, if a "best" match is found, e.g. if a matching imaging metric is also below a given error threshold, then the matching encoding $ε^j$ is retrieved from the data storage device 720 and is accessed by the registration engine 710. The registration engine 710 is then configured to instruct a similar alignment operation to that described in relation to FIG. 5; however, in the present case, the alignment is performed between the active model frame, $AMF_t$, and the matching encoding $ε^j$. For example, components of an active model frame, e.g. $\hat{D}_t^a$ and $\hat{C}_t^a$, may be aligned with components of the matching encoding $ε^j$, e.g. $ε_D^j$ and $ε_C^j$. In one case, an alignment metric may be evaluated and compared with a threshold to determine if alignment is to be performed, e.g. a low level of misalignment as compared to a predefined threshold is required to continue with the alignment. If alignment is not to be performed, the registration engine 710 may attempt to perform the alignment of active and inactive model frames as described with reference to FIG. 5. If alignment is to be performed, the registration engine 710 may be arranged to instruct a model deformer 740 to deform an existing three-dimensional model 750, e.g. determine a deformation in three-dimensions that acts to align the components of the active model frame with the components of the matching encoding. In certain cases, following this alignment, which may be considered a "global loop closure", active and inactive portions of the 3D surfel model are not updated. This may be because the alignment brings the active and inactive portions into greater alignment such that the registration shown in FIG. 5 may be performed (e.g. such that a "local loop closure" may be successfully performed on a next frame). Not updating the portions also enables potentially inaccurate alignments to be corrected or recovered from in subsequent registration operations. Following this alignment the current pose estimate $P_t$ may also be updated (e.g. in the form of $\hat{P}_t$) by applying the transform to a pose estimate associated with the encoding (e.g. $Hε_p^j$).

In the present example, the model deformer 740 is arranged to access the existing 3D surfel model 750 and deform this model using a deformation graph 760 to generate an aligned 3D surfel model 770. The deformation graph 760 comprises a set of nodes and edges that are associated with distributed surfels in model 750. In one case, each node may comprise: a timestamp; a position in three dimensions associated with a surfel; a transformation definition; and a set of neighbours. The neighbours of each node, i.e. neighbouring surfels, make up the edges of the graph, which may be directed. In this manner, the deformation graph connects portions of the 3D surfel model that influence each other when a deformation of the model is performed. The number of neighbours may be limited, e.g. in one implementation to four neighbours. The transformation definition may comprise a definition of an affine transformation, e.g. as represented by a 3 by 3 matrix (initialised to the identity matrix) and a 3 by 1 vector (initialised to zero), or by dual quaternions. When performing the deformation, the transformation definition of each node may be optimised according to a set of surface constraints. When a deformation is applied a set of influencing nodes in the graph for a particular surfel of the 3D surfel model are identified. Based on this, a position of a surfel may be deformed based on a weighted sum of the transformed influencing nodes, e.g. a weighted sum of the transformation definitions applied to each of the influencing nodes in accordance with a distance of a position of those nodes from the current positional element. Both the position and normal of a surfel may be deformed in this manner. For example, nodes in the deformation graph may be associated with surfels based on their initialisation time. A list of these nodes may then be sorted by this timestamp. When a deformation is instructed for a surfel, a binary search may be performed through this list of nodes to populate a set of temporally nearby nodes (the nodes here being associated with other surfels). From this set, a set of k-nearest nodes are determined for the surfel based on a distance metric. These nodes are used then to deform the surfel. This process is quick and helps enable real-time or near real-time performance.

In one example, a deformation graph may be constructed on a frame-by-frame basis. In one particular case, a new deformation graph for the three-dimensional model may be constructed for each frame of image data (i.e. $F_t$). This may comprise determining the connectivity of the deformation graph, e.g. the set of neighbours for each graph node. In one case, a deformation graph is initialised using the 3D surfel model 750. This may be referred to as an "in-map" or "in-model" loop closure, as the deformation graph is constructed from the surfel representation and is used to modify the same representation. For example, node positions for a frame may be determined from positions of surfels (e.g. p in FIG. 3B) and node timestamps may be set to surfel timestamps (e.g. the "Init_Time" of FIG. 3A). In one case, nodes for the deformation graph may be generated based on a sampling, such as a systematic sampling, of the surfels. This sampling may be uniformly distributed over the population, causing the spatial density of the deformation graph to mirror that of the 3D surfel model. The set of sampled nodes may be ordered based on the node timestamps. Following this, the connectivity of the deformation graph may be determined using time information. In one case, sets of nodes that are neighbours in time, e.g. based on the node timestamps, may be selected. For example, if there are four neighbours and a given node is being considered, nodes with the previous two timestamps (in a time-ordered list) and nodes with the subsequent two timestamps (in the list) may be selected as neighbours of the given node. This has an advantage of being computationally efficient and of preventing temporally uncorrelated areas of the 3D surfel model from influencing each other (e.g. preventing active areas influencing inactive areas). For example, a deformation graph associated with multiple passes of a common three-dimensional space may be complex and tangled within itself when considered spatially; however, ordering and considering the graph temporally allows the multiple passes to be disjoint and free to be aligned. This may be contrasted with comparative methods that determine graph connectivity based on pose times, e.g. in cases that use a pose graph.

An example process that may be applied by the model deformer 740 to use the deformation graph 760 to deform the existing three-dimensional model 750 to generate deformed model 770 will now be described in more detail. The model deformer 740 begins by accessing a given surfel definition. As a first operation, the model deformer 740 locates a node of deformation graph 760, e.g. another surfel, which is closest to the given surfel in time. The time separation is stored as a variable. Next the model deformer 740 locates temporally nearby nodes, e.g. moving away from the time separation for a predefined number of nodes to explore. These nearby nodes may then be sorted by a distance metric such as Euclidean distance with reference to the position of the given surfel. A given number of "neighbour" nodes, e.g. using the neighbour limit discussed above, may then be selected as the closest k nodes. A set of weights for each of these neighbours may then be generated based on a normalised distance between the node and the given surfel. The sum of the weights may also be determined. Then as a last operation the transformation definitions for the neighbours may be applied, as weighted via individual calculated weights for each neighbour and normalised by the sum of the weights. This may comprise applying the variables for the affine transformation discussed above with reference to the given surfel to deform a position and a normal vector of the surfel. Other aspects of the given surfel stay the same (e.g. may be copied to the deformed model 770). This then enables probability values to simply be copied across from the old surfel to the new deformed surfel without onerous processing. This again enables real-time implementations.

In one example, the alignment performed by way of the registration engine 560 or 710 is performed using the model deformer 740. In this example, this is achieved by optimising the parameters of the deformation graph 760. The optimisation may reflect a surface registration in the surfel representation given a set of surface correspondences that are set based on the output of the registration engine 560 or 710. These surface correspondences may indicate that a particular source position at a first time is to reach or coincide with a particular destination position at a second time. Each individual surface correspondence may be either absolute (relating a deformed position to an absolute position in three-dimensional space) or relative (relating a deformed position to a different deformed position). When aligning active and inactive frames (e.g. as described with reference to FIG. 5) the source point may be representative of a point in an active model frame and the destination point may be representative of a point in an inactive model frame, which acts to align the active and inactive portions of the model. For example, the first time may comprise a time of initialisation for inactive surfels that are used to generate a given inactive model frame; the second time may be a current frame time; the source point may be a sampled surfel that is used to generate an active model frame (e.g. used to compute $\hat{D}_t^a$), as viewed based on the current pose estimate $P_t$; and the destination point may be a sampled surfel that is used to generate an active model frame (e.g. used to compute $\hat{D}_t^a$), as viewed based on the current pose estimate $P_t$ plus a defined transformation, H, in three dimensions. In this case the destination point is equivalent to a point in the inactive model frame, as you are applying the defined transformation (H) which was calculated to map active portions of the model onto inactive portions, e.g. the transformation is at least part of the alignment performed by registration engine 560 in FIG. 5. These surface correspondences may be used to apply a "local loop closure". Similarly, when aligning an active frame with a stored representation (e.g. as described with reference to FIG. 7): the first time may comprise a time of initialisation for the stored representation; the second time may be a current frame time; the source point may be a sampled surfel that is used to generate an active model frame (e.g. used to compute $\hat{D}_t^a$), as viewed based on the current pose estimate $P_t$; and the destination point may be a sampled surfel that is used to generate an active model frame (e.g. used to compute $\hat{D}_t^a$), as viewed based on a pose estimate for the encoding plus a defined transformation, H, in three dimensions. Again as the defined transformation is applied to the active model portions, the destination point is representative of an alignment of the active and inactive models. These surface correspondences may be used to apply a "global loop closure". The surface correspondences may be calculated for a sampled set of pixels, e.g. for the frames used. In these cases the alignment or registration may comprise resolving the defined transformation in three dimensions for the set of surface correspondences.

In the above example, the surface correspondences may be used in one or more cost functions for the optimisation of the parameters of the deformation graph. For example, one cost function may comprise an error function equal to a sum of a distance error between a deformed source point (e.g. when applying the deformation graph) and a destination point, the source and destination points being those used in the surface correspondences. The temporal parameterisation of the surfel representation as described herein allows multiple passes of the same portion of three-dimensional space to be non-rigidly deformed into alignment allowing modelling to continue and new data fusion into revisited areas of the 3D surfel representation. Another cost function may also be used to "pin" an inactive portion of the surfel representation into place, i.e. to deform the active portions of the model into the inactive portions. This cost function may comprise an error function equal to a sum of a distance error between a deformed source point (e.g. when applying the deformation graph) and a non-deformed destination point, the destination point being that used in the surface correspondences. Another cost function may also be used to keep previously registered areas of the surfel representation in place, i.e. when deforming a different area of the map, the relative positions of previously registered areas may need to be constrained to remain the same. This cost function may comprise an error function equal to a sum of a distance error between a deformed source point (e.g. when applying the deformation graph) and a deformed destination point. This cost function prevents loop closures and their associated deformations from pulling apart previously registered areas of the surfel representation. Error functions may also be defined to maximise rigidity in the defined transforms of the deformation graph (e.g. by minimising a distance metric between the transform multiplied by its transpose and the identity matrix) and to ensure a smooth deformation (e.g. based on a distance metric incorporating neighbour transforms). One or more of these described error functions may be minimised (e.g. within a weighted sum) to determine the transform definitions for the deformation graph. For example, an iterative Gauss-Newton method, together with sparse Cholesky factorisation may be used to solve the system of equations on a processing unit. A graphical processing unit, if available in an implementation, may be used to apply the deformation graph to the surfel representation. This may be performed in parallel on the graphical processing unit. In certain cases, one or more of the cost functions may be used to generate a metric to determine whether an alignment should be performed. For example, if one or more of the cost functions output an error value that is below a predefined threshold value (e.g. such as the cost function comparing deformed source and destination points), then an alignment is accepted; if the error value is above a predefined threshold value then the alignment is rejected (with the equality case being assigned appropriately).

As described above, a predicted surface appearance-based place recognition operation may be used to resolve "global loop closures". This enables a globally consistent dense surfel representation or model to be generated without the use of a pose graph, e.g. without the use of a separate graph structure that is used to model the pose of a capture device with regard to key frames of the image data. An apparatus incorporating these components is thus able to perform real-time or near real-time dense simultaneously location and mapping, with the operation being actually simultaneous rather than being performed as two separate operations. In certain test cases, it is found that the local loop registration is performed more frequently than the global loop registration (e.g. at a 10 or 20-1 ratio). Global loop registration may not be performed (e.g. may not be needed or a match may not be found) in certain cases. The application of local and global loop registration may depend on the video data being processed, e.g. may depend on the trajectory of the observation using the capture device. In certain test cases: a number of frames was on the order of $10^3$; a number of surfels was on the order of $10^6$; and a number of deformation nodes and a number of stored representations was on the order of $10^2$. Frame processing for these test cases was between 20 and 40 milliseconds, depending on the number of positional elements currently in the three-dimensional model. This was around a 30 Hz or frames-per-second processing speed for the generation of the surfel representation without semantic labelling. In these test cases, a test platform utilised an Intel® Core i7-4930K processor at 3.4 GHz with 32 GB of memory and an nVidia® GeForce® GTX 780 Ti graphical processing unit with 3 GB of memory.

Figure 8:
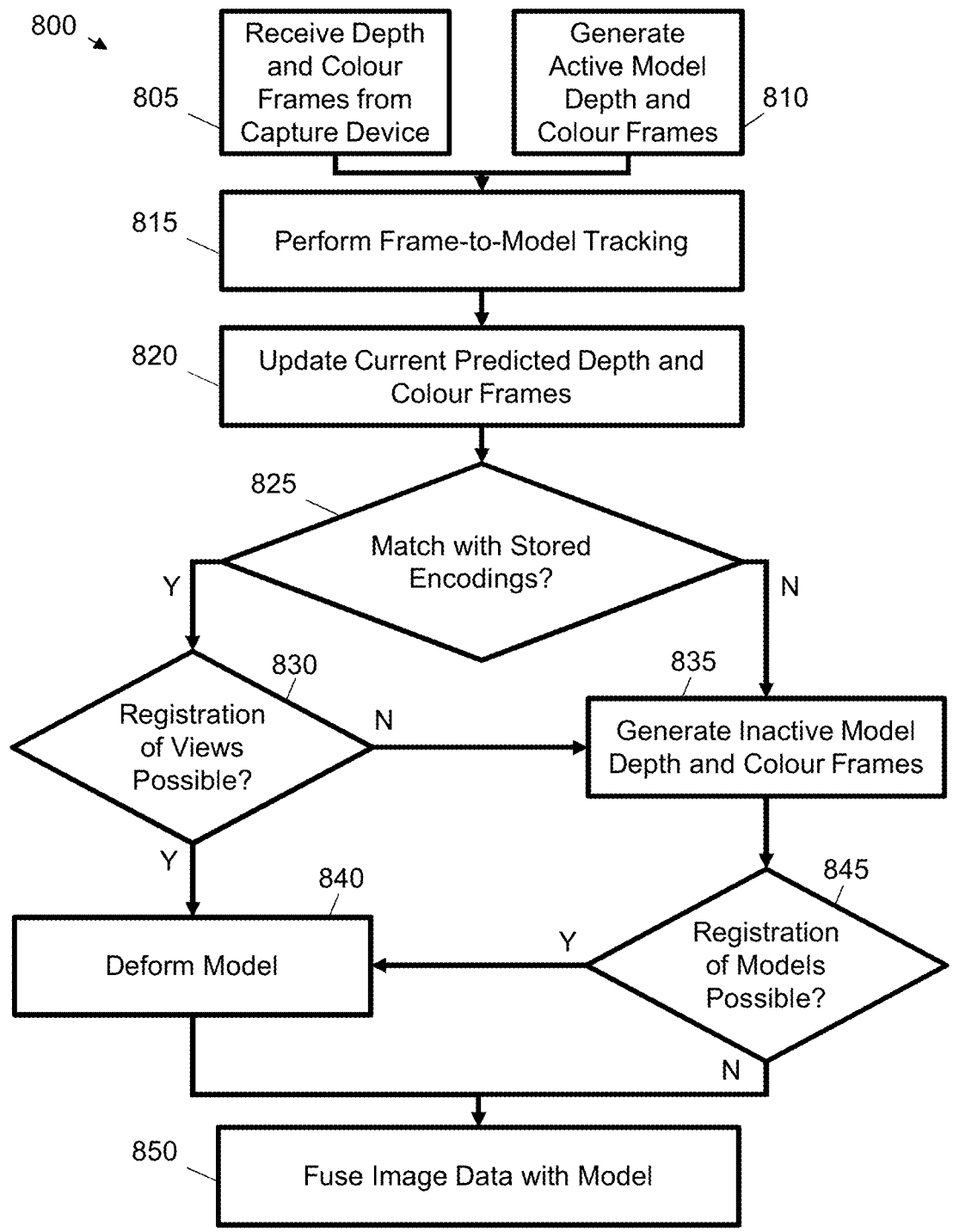
FIG. 8 is a flow diagram showing an example process for processing frames of video data to update a representation of a three-dimensional space.

FIG. 8 shows a method 800 of updating a 3D surfel representation that may run in parallel with the method 600 of FIG. 6. At block 805, depth and colour frames are received from a capture device. At block 810, predicted frames based on active portions of the 3D surfel representation are generated. This may comprise processing surfel definitions and only using surfels with a last modified timestamp within a particular time window, e.g. in relation to a current time. This may further comprise using a pose estimate for the capture device at a time t−1, e.g. wherein surfels that are classified as "active" are projected onto a plane indicating the location and orientation of an area viewable by the capture device at time t−1. At block 815, frame-to-model tracking is performed. This may comprise determining a pose estimate for the current time by comparing the data received from blocks 805 and 810. At block 820, the determined pose estimate for the current time may be used to update the predicted depth and colour frames, e.g. to project (or "splatter") surfels that are classified as "active" onto a 2D plane indicating the location and orientation of an area viewable by the capture device at time t as indicated by the current pose estimate.

At 825 a determination is made as to whether the updated predicted depth and colour frames match any stored encodings. This may comprise the comparisons described with reference to FIG. 7. If a match is found with a particular stored representation then at block 830 a determination is made as to whether registration of the updated predicted depth and colour frames and data corresponding to the particular stored encoding is possible. This may comprise applying the deformation described with reference to the model deformer 740 in FIG. 7. If an output of one or more cost functions indicates that a deformation using a deformation graph results in an error above a given threshold, given surface correspondences that constraint points in one or more of the updated predicted frames to the stored encodings, then the determination may be in the negative; otherwise, the determination may be in the positive. If the determination at block 830 is negative, e.g. there is deemed to be no possible registration between a stored representation and updated predicted frames, the method moves to block 835, wherein inactive model frames of depth and colour data are generated. If the determination at block 835 is positive, e.g. there is deemed to be a possible registration between a stored encoding and updated predicted frames, then the 3D surfel representation is deformed at block 840. This may comprise applying an optimised deformation graph, wherein the optimisation is constrained by the aforementioned surface correspondences, and wherein the optimisation minimises one or more error functions to determine transformation definitions to be applied by nodes of the deformation graph.

At block 835, inactive model frames of depth and colour data are generated. At block 845, a determination is made as to whether the updated predicted frames at block 820 can be registered with the inactive model frames generated at block 835. Block 845 effective determines whether registration of the active model portions with the inactive model portions is possible based on data indicative of predicted views generated from each of the two portions in association with a current pose estimate. The determination at block 845 may be based on a comparison of the two sets of predicted views using the techniques applied as part of the frame-to-model tracking at block 815, e.g. by determining a geometric and/or photometric error. In one case, an output of a weighted error function comprising the geometric and/or photometric error may be used, amongst other metrics, to make the determination at block 845, e.g. if the error is below a given threshold registration is deemed possible. Eigenvalues of a covariance measure for the error function may also be evaluated, e.g. compared with a threshold, to make the determination. Block 845 may also comprise determining a transformation that maps the predicted frames onto each other, e.g. in a similar manner to determining a transformation for use in estimating the pose. This transformation may be used in a determination similar to that made at block 830, i.e. may form part of a surface correspondence that is used to constraint an optimisation, wherein it may contribute to a metric used to determine if a registration of active and inactive portions is possible.

If there is a positive determination at block 845, a deformation of the active and inactive portions of the surfel representation is performed at block 840. This may comprise applying the transformation determined as part of the evaluation of block 845. Again, block 840 may comprise determining a set of deformation parameters, e.g. as a result of an optimisation, wherein the parameters may form part of a deformation graph. Block 840 may comprise applying the parameters using the graph to deform surfels. The output of block 840 may set all visible inactive surfels, e.g. those visible in the inactive model frame, to active.

Finally, at block 850 the depth and colour frames received at block 805 are fused with any deformed surfel representation resulting from block 840. If the determination at block 845 is negative, no deformation may be performed and the image data may be fused with an un-deformed representation.

Following block 850 the method may be repeated for a subsequent frame of video data, e.g. returning to block 805 where the next frames of depth and colour data are received. The fused surfel representation that is output at block 850 may then be used to generate revised active model depth and colour frames at block 810, e.g. to track against the next frames. After the repetition of block 810 an encoding may be stored for later use in the matching of block 825.

Certain methods described above bring active areas of a surfel representation into strong alignment with inactive areas of the representation to achieve tight local loop closures. This may be with respect to surface of the surfel representation. In the event of active portions of the representation drifting too far from inactive portions for a local alignment to converge, an appearance-based global loop closure method may be used to bootstrap a deformation that realigns the active portions of the representation with the underlying inactive portions for tight global loop closure and representation consistency, e.g. with respect to modelled surfaces.

A simplified worked example 900 demonstrating how a surfel representation may be updated will now be described with reference to FIGS. 9A to 9C.

Figure 9A:
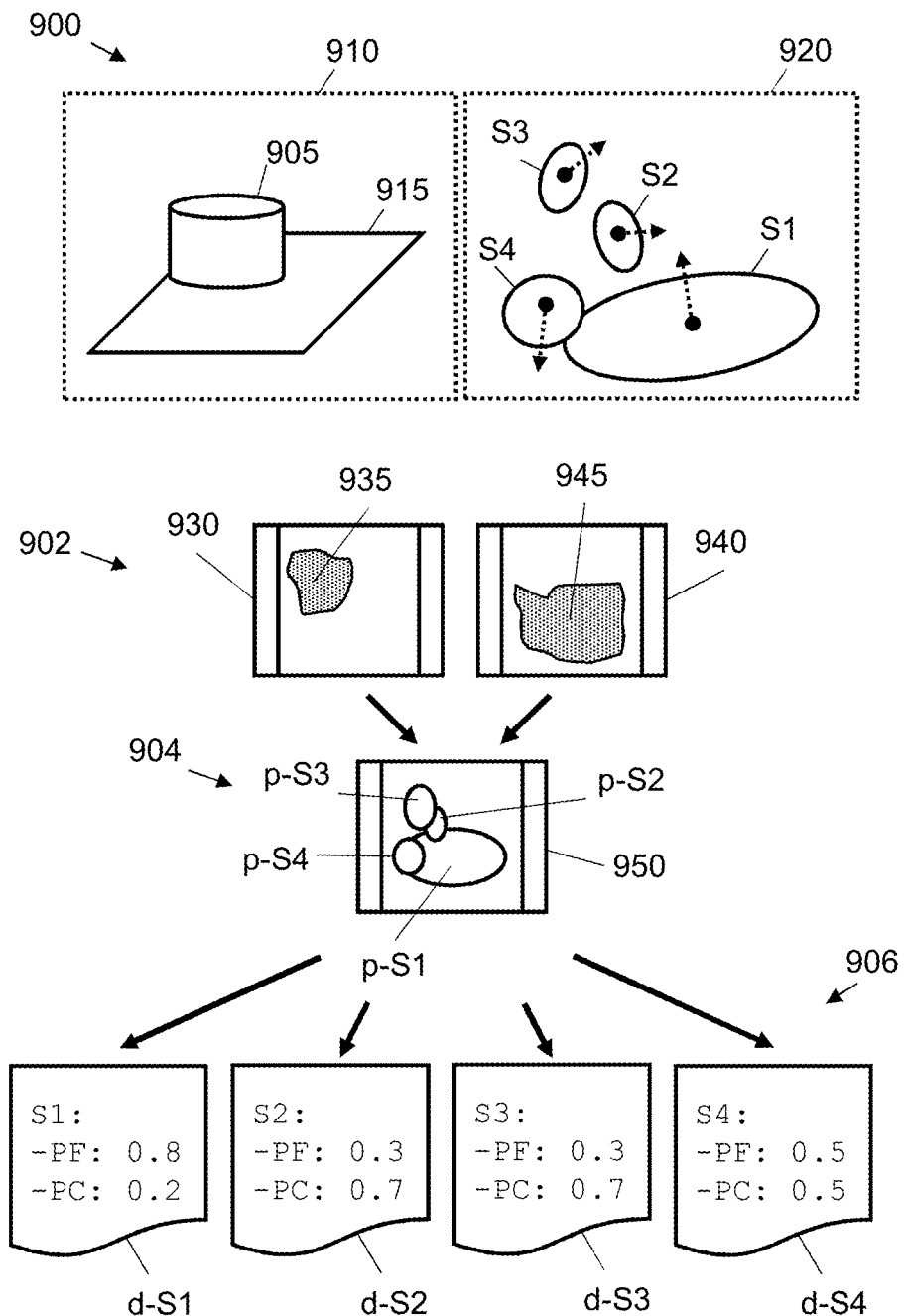
FIGS. 9A to 9C are schematic diagrams showing a worked example of updating a surface element representation.

FIG. 9A shows an illustration of a scene 910 comprising a cylindrical object 905 positioned upon a floor 915. Scene 910 in the Figures represents a "ground truth", i.e. the actual contents of the scene. Also shown in the Figures is a 3D surfel representation 920. In practice, the 3D surfel representation 920 may be implemented as a list as described with reference to FIGS. 3A and 3B; however, for ease of explanation, the extent of the surfels within 3D model space are illustrated in the Figures (assume 920 is a view of a 3D model despite the Figure being 2D). In the 3D surfel representation 920 there are four surfels: S1 to S4. As may be understood this has been greatly simplified for ease of explanation, a typical surfel representation may comprise a million or so surfels. The surfel representation 920 represents a model state after a SLAM system has been running for a given length of time (or alternately after an existing representation has been loaded), as surfel S1 can be seen to approximately correspond to a vertical floor plane and surfels S2 to S4 approximately model different surfaces of the cylindrical object. The normal vectors for the surfels S1 to S4 are also shown in the Figures.

FIG. 9A further shows two example object-label probability distributions 902. In this simple case there are assumed to be two object labels that maybe assigned by an image classifier: 'FLOOR' and 'CYLINDER'. The object-label probability distributions in this case comprise two images 930 and 940. As may be seen from the Figure, each image has pixel values that indicate a probability that an object having the object label is present in the pixel. For example, the first image 930 has a set of pixels 935 with pixel values (e.g. between 0.5 and 1 or 128 and 255 depending on value scaling) indicating that the image classifier indicates that a 'CYLINDER' object appears present in those pixels. Similarly, the second image 940 has a set of pixels 945 with pixel values (e.g. between 0.5 and 1 or 128 and 255 depending on value scaling) indicating that the image classifier indicates that a 'FLOOR' object appears present in those pixels. Although shown as binary images in the Figure, in practice such images are typically viewable as grayscale images.

In FIG. 9A example correspondence data 904 for a frame is also shown. In this case, the correspondence data 904 is also in the form of a correspondence image 950, which is the same resolution as images 930 and 940. The correspondence image 950 features a projection of the 3D surfels onto a 2D image plane based on a current camera pose. In FIG. 9A the camera pose relates to a view of the scene as shown in box 910, i.e. with the cylindrical object in the upper left corner of a room. The correspondence image 950 comprises pixels having one of four values: [1, 2, 3, 4] identifying one of the four surfels S1 to S4, wherein a first set of pixels p-S1 have a value of 1 representing a correspondence to surfel S1, a second set of pixels p-S2 have a value of 2 representing a correspondence to surfel S2, a third set of pixels p-S3 have a value of 3 representing a correspondence to surfel S3 and a fourth set of pixels p-S4 have a value of 4 representing a correspondence to surfel S4. In other cases, in a similar manner to the image classifier data, the correspondence image 950 could comprise four binary images. The correspondence values are used to update probability values 906 associated with each surfel based on the probability values in images 930 and 940. In FIG. 9A four data definitions for the set of surfels are shown: d-S1 to d-S4, wherein each data definition for each surfel has object label probability values for the two classes ('PF' indicating probability of label 'FLOOR' and 'PC' indicating probability of label 'CYLINDER'). If PF and PC are initialised with uniform distributions (i.e. 0.5 per value) then the update operation comprises multiplying initial values by all the probability values associated with that class for pixels associated with a given surfel. For example, a PC value of 0.5 for surfel 2 may be multiplied by all the probability values for the pixels covering the area p-S2 in image 930 (plus normalisation). In certain parallelized processing pipelines, if a surfel has multiple corresponding pixels, probabilities for a surfel may be updated using a subset of those corresponding pixels. For example, for faster operation, a first occurrence of a given surfel identifier in image 950 (e.g. in row-major order) may be used to update the surfel probabilities in preference to other occurrences of the same surfel identifier. A probability update may also comprise a normalisation process that is applied to the surfel state. FIG. 9A shows data definitions for the surfels following one update.

Figure 9B:
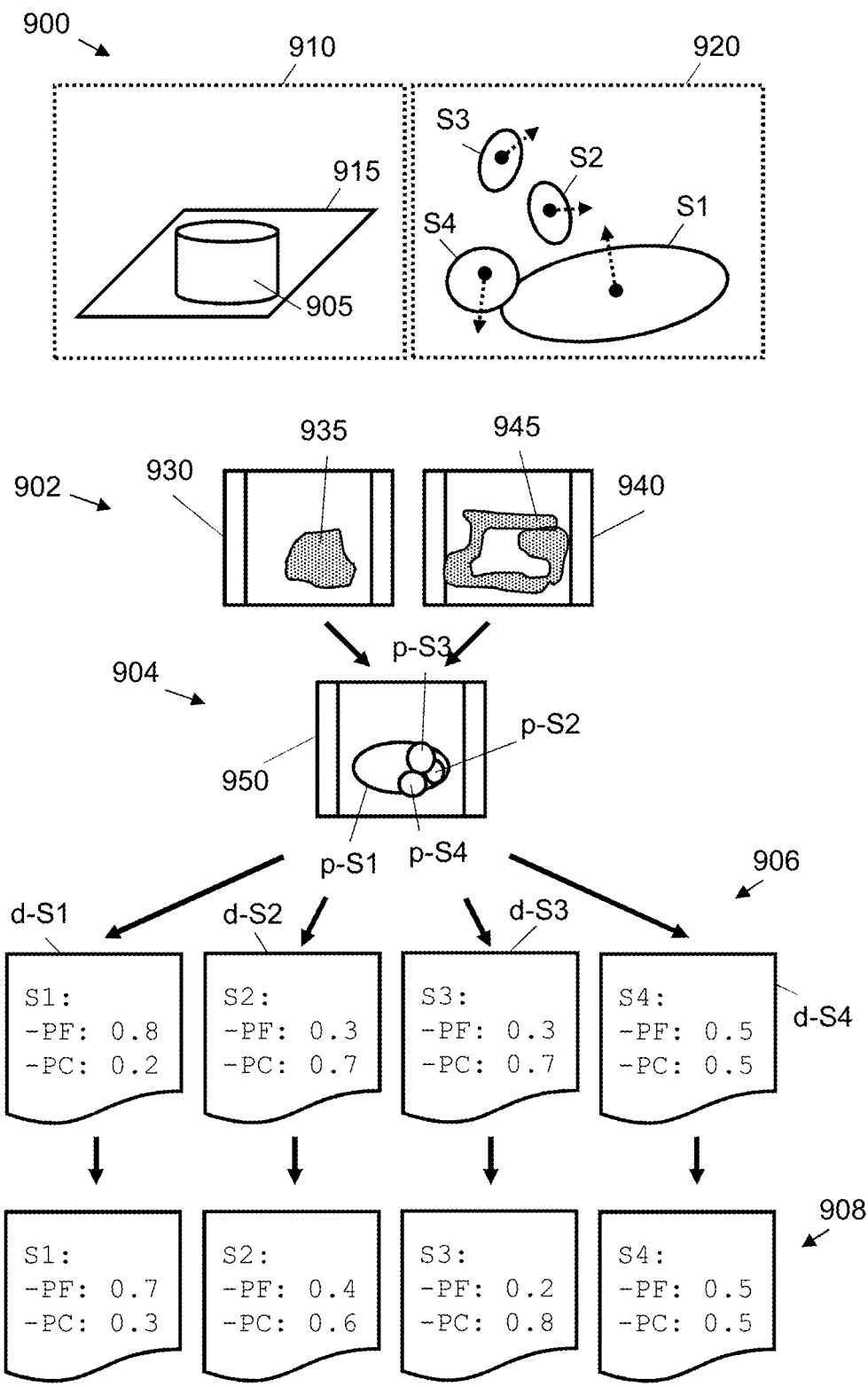

FIG. 9B shows the same elements as FIG. 9A but this time the scene is viewed from a different angle (i.e. there is a different camera pose). This may reflect operations for a second (i.e. subsequent) frame of video data. As shown in box 910 the cylindrical object is now viewed from behind with respect to FIG. 9A. This then results in different data 902 from the image classifier and a different set of projected pixels, although the surfel representation 920 remains the same (as it is defined in 3D). In FIG. 9B the object-label probability values as embodied in image 930 and 940 are again used to update the existing probabilities in the surfel data definitions based on the correspondence data 904.

Figure 9C:
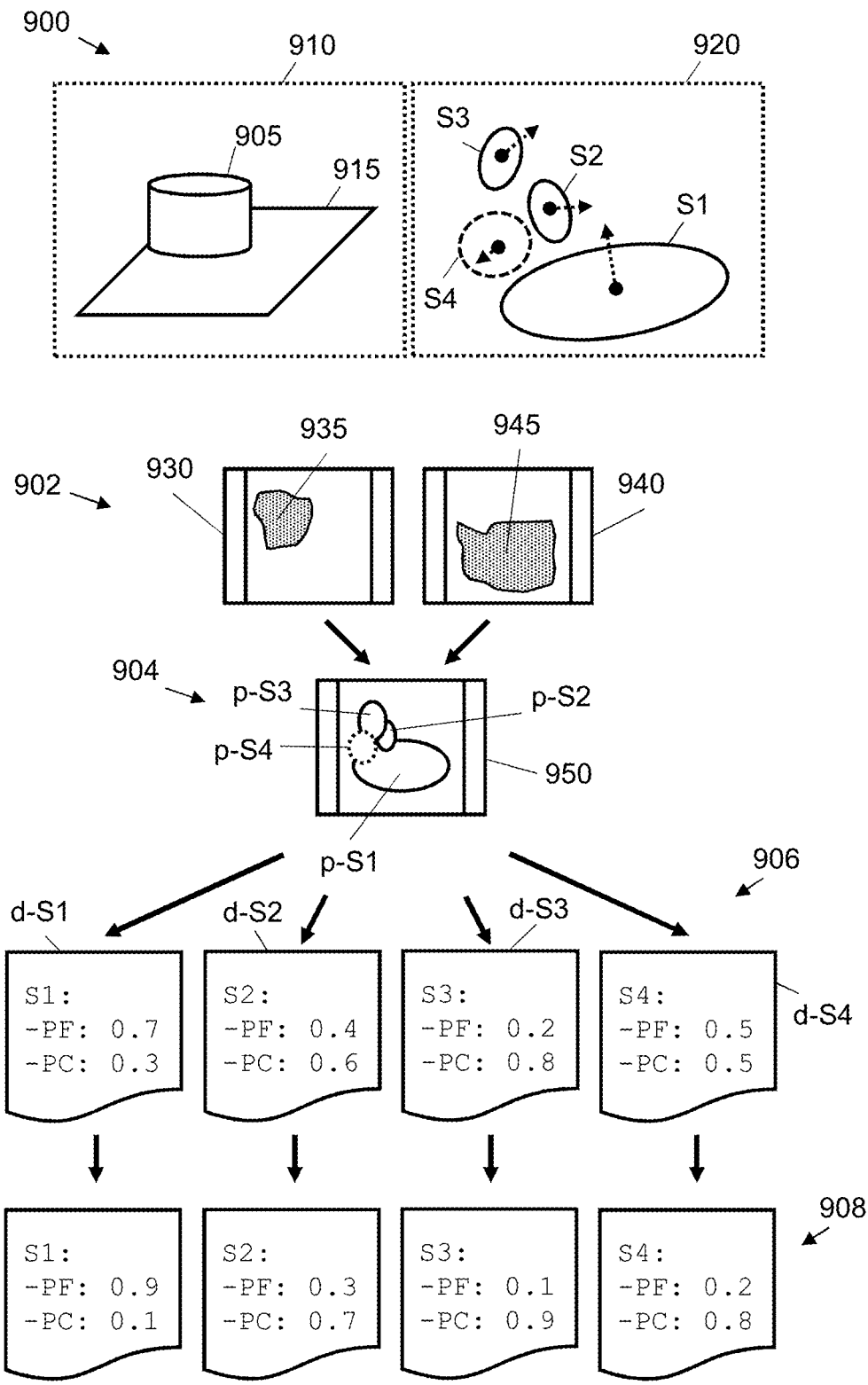

FIG. 9C shows a return to a similar view as that shown in FIG. 9A, following the change in view shown in FIG. 9B. In the example, this return to a similar view triggers a loop closure event that deforms surfel S4, as can be seen in the surfel representation 920. This may relate to a third (i.e. another subsequent) frame of video data. In this case, spurious data or optimisation drift may have initially meant that surfel S4 drifted from surfels S2 and S3, despite the fact that a more accurate model has surfels S2 to S4 relate to surfaces of the cylindrical object 905. As can be seen in FIG. 9C as the scene is viewed from a similar angle to FIG. 9A, the data 902 from the image classifier in FIG. 9C is similar to that shown in FIG. 9A. However, because surfel S4 has been deformed, the correspondence data 904 in FIG. 9C now differs from that provided in FIG. 9A. This means that similar probability values from data 902 now lead to a different surfel data definition update: in particular because the projected pixels p-S4 are shifted up in correspondence data 904, the probability values for surfel S4 are now weighted more heavily by pixel values 935 and weighted less heavily by pixel values 945. This then leads to a more accurate classification for surfel S1, as more probability values in pixels 945 are used in the update (previously, some of these values were applied to surfel S4 rather than S1 as pixels p-S4 overlaid p-S1 in 950 in FIG. 9A). It also leads to a more accurate classification for surfel S4 as it is now influenced by pixel values 935 due to the overlap of this area with the revised p-S4. The surfel object-label probability values shown in updated data definitions 908 in FIG. 9C are now more accurate than the previous definitions in FIGS. 9A and 9B. In the case of the updated data definitions 908, if a threshold for object-model replacement was set at 70% or above, then surfel S1 would be replaced by a 'floor' object model and surfels S2, S3 and S4 would be replaced by a 'cylinder' object (as scaled based on the surfel dimensions).

Figure 10A:
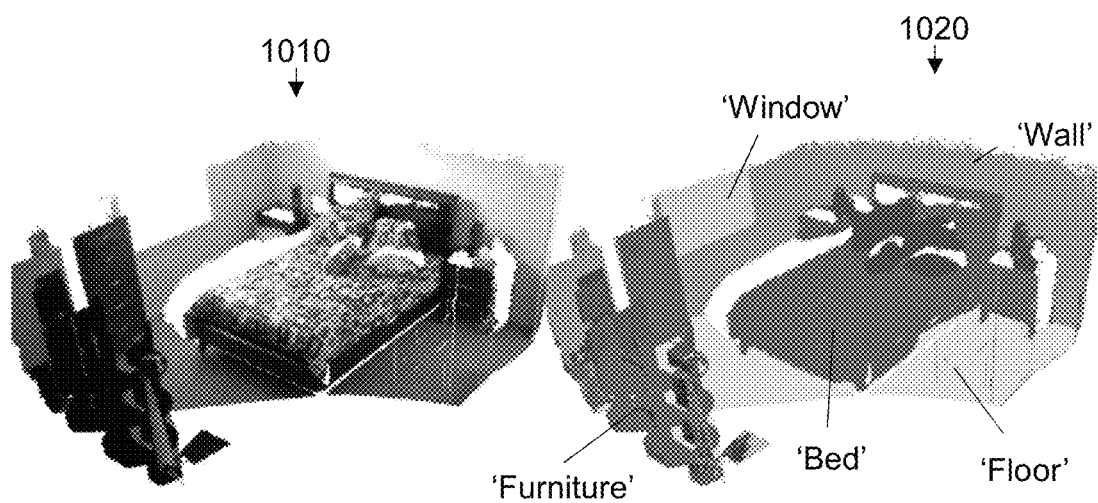
FIGS. 10A and 10B are illustrations showing example scenes and semantically-labelled output.
Figure 10B:
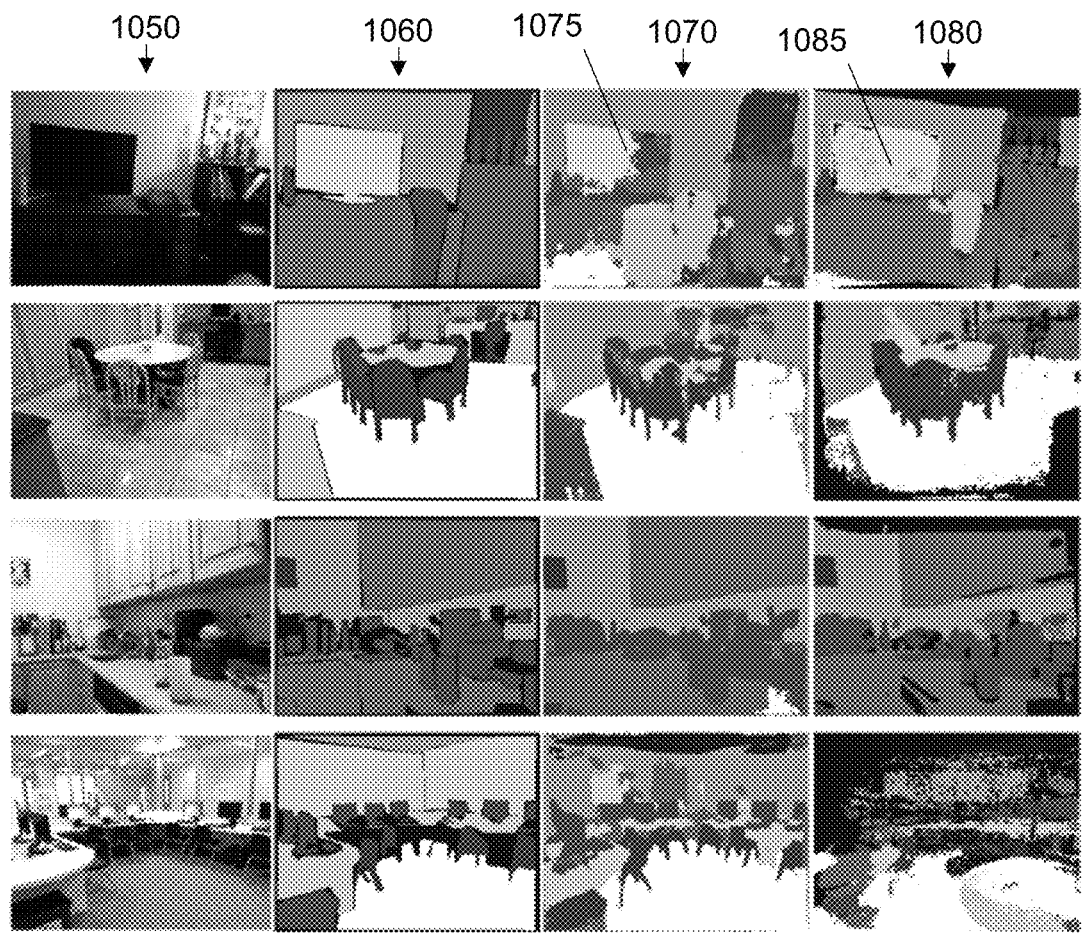

FIGS. 10A and 10B show example test output from the methods and apparatus described above. FIG. 10A shows a surfel representation 1010 of a bedroom that was created by applying a SLAM system to the NYU Depth Dataset V2 (as referred to above). FIG. 10B then also shows a semantically labelled surfel representation 1020 of the same scene. In this case, an object label for a surfel is selected as the object label with the highest probability value for that surfel. Different labels have different shades. The labels 'Window', 'Wall', 'Furniture', 'Bed' and 'Floor' and their respective shade are indicated in FIG. 10B. It should be noted that the representations 1010 and 1020 have been generated entirely automatically based on input video data—there is no manual labelling of items.

FIG. 10B shows other scenes from the NYU Depth Dataset V2. Each row relates to a different scene. The first column of images 1050 shows an input frame of video data. The second column 1060 shows the "ground truth", i.e. human annotations of class labels. The third column 1070 shows object labels assigned following classification of a single frame. The fourth column 1080 shows an example output using an implementation of the methods and apparatus described herein. As can be seen be comparing areas 1075 and 1085, the present methods and apparatus provide a more consistent and accurate output that is nearer to the "ground truth".

FIGS. 10A and 10B demonstrate that using a SLAM system to provide pixel-wise correspondences between frames allows for the fusion of per-frame 2D segmentations into a coherent 3D semantic map. Moreover, this coherent 3D semantic map is generated with a real-time, loop-closure capable approach suitable for interactive room scanning and the results show a significant improvement in the corresponding 2D segmentation accuracy. This then provides opportunities for real-time semantic segmentation on low memory and power mobile devices, e.g. smartphones or domestic robotic devices. On generated test sets, there was seen a large improvement in labelling accuracy using the described methods and apparatus than the NYU Depth Dataset V2, which typically features less varied trajectories. This demonstrates the accuracy advantages of the present methods when there viewpoint variation in the video data. This may be particularly advantageous for autonomous agent in the field, wherein significantly longer and more varied trajectories are used. Certain examples described herein are suitable for real-time interactive use, e.g. a human or robot making use of a real-time measure of labelling quality (i.e. the object-label probabilities associated with surfels) to make decisions about how to move a capture device to obtain full labelling coverage and to resolve ambiguities. Moreover, object labels may be feed-back into any SLAM system to improve the accuracy of the 3D representation. For example, loop closure operations may use object correspondences to provide alignment and/or object- or class-specific smoothing.

In certain cases, replacing groups of surfels that have been identified as a specific object with a complete and geometrically accurate model from a database may have several benefits. For example, object replacement may improve the precision of the map representation (e.g. allow for representation of accurate keys on a desktop computer keyboard). It may also regularise previous noisy depth estimates with semantically meaningful scene priors (e.g. allow for perfectly planar walls or floors in a representation). Furthermore, it may also fill in map areas that have not yet been observed in the video data with a sensible approximation for what may be there, (e.g. an unseen 'other' side of a mug may be represented if surfels are replaced with a simple cylinder). A map representation with object replacement may also have an additional benefit of a reduction in storage requirements, as few parameters are required to describe a single object instance, as opposed to many thousands of individual surfels.

Examples of functional components as described herein with reference to FIGS. 2, 4, 5 and 7 may comprise dedicated processing electronics and/or may be implemented by way of computer program code executed by a processor of at least one computing device. In certain cases one or more embedded computing devices may be used. This may comprise at least one processor operating in association with memory to execute computer program code loaded onto a computer readable medium. This medium may comprise solid state storage such as an erasable programmable read only memory and the computer program code may comprise firmware. In other cases, the components may comprise a suitably configured system-on-chip, application-specific integrated circuit and/or one or more suitably programmed field-programmable gate arrays. In one case, the components may be implemented by way of computer program code and/or dedicated processing electronics in a mobile computing device and/or a desktop computing device. In one case, the components may be implemented, as well as or instead of the previous cases, by one or more graphical processing units executing computer program code. In certain cases, the components may be implemented by way of one or more functions implemented in parallel, e.g. on multiple processors and/or cores of a graphics processing unit.

In certain cases described herein, the surfel representation (e.g. 270, 570, 530) is a "dense" model of a 3D space. In this case, there are a large number of surfels forming the model, e.g. hundreds of thousands or millions of elements. This may be compared to a feature-based or "sparse" model wherein there may only be tens or hundreds of defined model points. Similarly, the surfel representation may be deemed "dense" as pixel values within frames of video data are processed and contribute to the modelling and labelling of the three-dimensional space. For example, in a "dense" representation every pixel in a frame may contribute as much information as possible to the tracking, mapping and labelling procedure. This enables a surfel 3D model to be projected back into a synthetic capture device or camera to reconstruct a "dense" image, i.e. an image at the resolution of the capture device where the vast majority of pixels in the synthesised image have data synthesised based on information stored with the model. In contrast, a "sparse" system, e.g. one that utilises key-points or extracted features, only uses a small subset of pixel values in the image data to generate a model. In the "sparse" case, a synthesised images cannot be created at a capture device resolution, as there is not enough information within the model. In this manner, a "dense" system acts to estimate one or more surfaces within a three-dimensional space with high accuracy, e.g. within a given tolerance of a real environment.

In certain cases, the apparatus, systems or methods described above may be implemented with autonomous robotic devices. In this case a semantically labelled representation may be used by the device to navigate a three-dimensional space. For example, a robotic device may comprise a capture device, a surfel model generator, a data storage device configured to store a 3D surfel model, a semantic augmenter, a navigation engine and one or more movement actuators. In this case, the robotic device may be configured to capture video data as the robotic device navigates a particular environment. As this occurs, the robotic device may be arranged to generate a semantically labelled surfel model as described herein and store this in the data storage device. The navigation engine may then be configured to access the surfel model to navigate the robotic device within the environment. In one case, the robotic device may be arranged to perform one or more functions. For example, the robotic device may be arranged to performing a mapping function, locate particular persons and/or objects (e.g. in an emergency), transport objects, perform cleaning or maintenance etc. To perform one or more functions the robotic device may comprise additional components, such as further sensory devices, vacuum systems and/or actuators to interact with the environment. These functions may then be applied based on the object labels or object label probabilities. For example, a domestic robot may be configured to apply one set of functions to portions of the space with a 'carpet floor' label and another set of functions to portions of the space with a 'linoleum floor' label. Similar, the navigation engine may be configured to use areas of space labelled as 'door' as an exit and/or entry point. In one example, a domestic robot may use object classifications or probabilities, e.g. as computed in the examples above, to predict a room type or location. For example, if clusters of labelled surfels indicate that a 'sofa' and a 'coffee table' are detected in a space then the space may be classified as a room of room type 'sitting room'. Similarly, if surfels have labels indicating the presence of a 'bed' a room may be classified as being of a 'bedroom' type or surfels labelled as 'oven' may enable a room to be classified as a 'kitchen'. Room predictions may be a function of surfel probabilities and/or replaced object definitions. Using surfel probabilities enables room prediction to be a probabilistic function, e.g. for room classes to be assigned corresponding probabilities based on the detected object probabilities.

The above examples are to be understood as illustrative. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method for detecting objects in video data, comprising:
    determining object-label probability values for spatial elements of frames of video data using a two-dimensional image classifier, wherein the object-label probability value for each of the spatial elements indicates a probability that the respective spatial element is an observation of a particular object;
    identifying surface elements in a three-dimensional surface element representation of a space observed in the frames of video data that correspond to the spatial elements, wherein a correspondence between a spatial element and a surface element is determined based on a projection of the surface element representation using an estimated pose for a frame; and
    updating object-label probability values for the surface elements based on the object-label probability values for corresponding spatial elements to provide a semantically-labelled three-dimensional surface element representation of objects present in the video data, wherein the object-label probability value for each of the surface elements indicates a probability that the respective surface element represents the particular object.

2. The method of claim 1, wherein, during processing of said video data, the method comprises:
    detecting a loop closure event and applying a spatial deformation to the surface element representation, the spatial deformation modifying three-dimensional positions of surface elements in the surface element representation,
    wherein the spatial deformation modifies the correspondence between spatial elements and surface elements of the surface element representation such that, after the spatial deformation, object-label probability values for a first surface element are updated using object-label probability values for spatial elements that previously corresponded to a second surface element.

3. The method of claim 1, comprising:
    processing the frames of video data without a pose graph to generate the three-dimensional surface element representation, including, on a frame-by-frame basis:
    comparing a rendered frame generated using the three-dimensional surface element representation with a video data frame from the frames of video data to determine a pose of a capture device for the video data frame; and
    updating the three-dimensional surface element representation using the pose and image data from the video data frame.

4. The method of claim 3, wherein:
    a subset of the frames of video data used to generate the three-dimensional surface element representation are input to the two-dimensional image classifier.

5. The method of claim 1, wherein the frames of video data comprise at least one of colour data, depth data and normal data; and
    wherein the two-dimensional image classifier is configured to compute object-label probability values based on at least one of colour data, depth data and normal data for a frame.

6. The method of claim 1, wherein the two-dimensional image classifier comprises a convolutional neural network.

7. The method of claim 6, wherein the convolutional neural network is configured to output the object-label probability values as a set of pixel maps for each frame of video data, each pixel map in the set corresponding to a different object label in a set of available object labels.

8. The method of claim 6, wherein the two-dimensional image classifier comprises a deconvolutional neural network communicatively coupled to the output of the convolutional neural network.

9. The method of claim 1, comprising, after the updating of the object-label probability values for the surface elements:
    regularising the object-label probability values for the surface elements.

10. The method of claim 9, wherein regularising comprises:
    applying a conditional random field to the object-label probability values for surface elements in the surface element representation.

11. The method of claim 9, wherein regularising the object-label probability values comprises:
    regularising the object-label probability values assigned to surface elements based on one or more of: surface element positions, surface element colours, and surface element normals.

12. The method of claim 1, comprising:
    replacing a set of one or more surface elements with a three-dimensional object definition based on the object-label probability values assigned to said surface elements.

13. The method of claim 1, comprising:
    annotating surface elements of a three-dimensional surface element representation of a space with object-labels to provide an annotated representation;
    generating annotated frames of video data from the annotated representation based on a projection of the annotated representation, the projection using an estimated pose for each annotated frame, each annotated frame comprising spatial elements with assigned object-labels; and
    training the two-dimensional image classifier using the annotated frames of video data.

14. The method of claim 1, comprising:
    obtaining a first frame of video data corresponding to an observation of a first portion of an object;
    generating an image map for the first frame of video data using the two-dimensional image classifier, said image map indicating the presence of the first portion of the object in an area of the first frame; and
    determining that a surface element does not project onto the area in the first frame and as such not updating object-label probability values for the surface element based image map values in said area;
    wherein following detection of a loop closure event the method comprises:
    modifying a three-dimensional position of the surface element;
    obtaining a second frame of video data corresponding to a repeated observation of the first portion of the object;
    generating an image map for the second frame of video data using the two-dimensional image classifier, said image map indicating the presence of the first portion of the object in an area of the second frame;
    determining that the modified first surface element does project onto the area of the second frame following the loop closure event; and
    updating object-label probability values for the surface element based on the image map for the second frame of video data, wherein the object-label probability values for the surface element include fused object predictions for the surface element from multiple viewpoints.

15. Apparatus for detecting objects in video data comprising:
an image-classifier interface to receive two-dimensional object-label probability distributions for spatial elements of individual frames of video data, wherein the object-label probability distribution for each of the spatial elements includes a set of object-label probability values, and each of the set of object-label probability values indicates a probability that the respective spatial element is an observation of a different respective object;
a correspondence interface to receive data indicating, for a given frame of video data, a correspondence between spatial elements within the given frame and surface elements in a three-dimensional surface element representation, said correspondence being determined based on a projection of the surface element representation using an estimated pose for the given frame; and
a semantic augmenter to iteratively update object-label probability values assigned to individual surface elements in the three-dimensional surface element representation,
wherein the semantic augmenter is configured to use, for a given frame of video data, the data received by the correspondence interface to apply the two-dimensional object-label probability distributions received by the image classifier interface to a set of object-label probability values assigned to corresponding surface elements, wherein each of the set of object-label probability values for each of the surface elements indicates a probability that the respective surface element represents a different respective object.

16. The apparatus of claim 15, wherein:
the correspondence interface is configured to provide an updated correspondence following a spatial deformation of the surface element representation, the spatial deformation enacting a loop closure within the video data, and
the semantic augmenter is configured to use the updated correspondence to update object-label probability values for a first surface element using object-label probability values for spatial elements that previously corresponded to a second surface element.

17. The apparatus of claim 15, wherein the image-classifier interface is configured to receive a plurality of image maps corresponding to a respective plurality of object labels for a given frame of video data, each image map having pixel values indicative of probability values for an associated object label.

18. The apparatus of claim 15, comprising:
a regulariser to regularise the object-label probability values assigned to the surface elements of the surface element representation.

19. The apparatus of claim 18, wherein the regulariser is configured to apply a conditional random field to the object-label probability values for surface elements in the surface element representation.

20. The apparatus of claim 18, wherein the regulariser is configured to regularise the object-label probability values assigned to surface elements based on one or more of: surface element positions, surface element colours, and surface element normals.

21. The apparatus of claim 15, wherein the semantic augmenter is configured to replace a set of one or more surface elements with a three-dimensional object definition based on the object-label probability values assigned to said surface elements.

22. The apparatus of claim 15, wherein each surface element in the surface element representation comprises at least data defining a position of the surface element in three-dimensions and data defining a normal vector for the surface element in three-dimensions, and wherein each surface element represents a two-dimensional area in three-dimensional space.

23. A video processing system for detecting objects present in video data comprising:
an apparatus for detecting objects in video data comprising:
an image-classifier interface to receive two-dimensional object-label probability distributions for individual frames of video data;
a correspondence interface to receive data indicating, for a given frame of video data, a correspondence between spatial elements within the given frame and surface elements in a three-dimensional surface element representation, said correspondence being determined based on a projection of the surface element representation using an estimated pose for the given frame; and
a semantic augmenter to iteratively update object-label probability values assigned to individual surface elements in the three-dimensional surface element representation, wherein the semantic augmenter is configured to use, for a given frame of video data, the data received by the correspondence interface to apply the two-dimensional object-label probability distributions received by the image classifier interface to object-label probability values assigned to corresponding surface elements;
a video acquisition interface to obtain frames of video data from a capture device, said frames of video data resulting from relative movement between the capture device and a three-dimensional space over time; and
a simultaneous location and mapping (SLAM) system communicatively coupled to the correspondence interface of the apparatus to generate a surface element representation of the three-dimensional space based on the obtained frames of video data,
wherein the SLAM system is configured to apply a spatial deformation to the surface element representation to close loops of observation within the frames of video data, said spatial deformation resulting in a new three-dimensional position for at least one modified surface element in the surface element representation.

24. The video processing system of claim 23, wherein the SLAM system comprises:
a segmenter configured to segment the three-dimensional surface element representation into at least active and inactive portions based on at least one representation property,
wherein the SLAM system is configured to compute an active rendered frame based on a projection from the active portions of the surface element representation to update said representation over time; and
a registration engine configured to align active portions of the three-dimensional surface element representation with inactive portions of the three-dimensional surface element representation over time, the registration engine being configured to:

compute an inactive rendered frame based on a projection from the inactive portions of the three-dimensional surface element representation;
determine a spatial deformation that aligns the active rendered frame with the inactive rendered frame; and
update the three-dimensional surface element representation by applying the spatial deformation.

25. The video processing system of claim 23, wherein the SLAM system comprises:
a frame-to-model tracking component configured to compare the active rendered frame to a provided frame from said video data to determine an alignment of the active portions of the three-dimensional surface element representation with the video data.

26. The video processing system of claim 24, wherein the registration engine is configured to use a deformation graph to align active portions of the three-dimensional surface element representation with inactive portions of the three-dimensional surface element representation, the deformation graph being computed based on an initialisation time for surface elements, the deformation graph indicating a set of surface-element neighbours for a given surface element that are to be used to modify the given surface element during alignment.

27. The video processing system of claim 24, comprising:
a two-dimensional image classifier communicatively coupled to the image-classifier interface to compute object-label probability distributions for frames of the video data obtained from the video acquisition interface.

28. The video processing system of claim 27, wherein the two-dimensional image classifier comprises a convolutional neural network.

29. The video processing system of claim 28, wherein the convolutional neural network is configured to output the object-label probability values as a set of pixel maps for each frame of video data.

30. The video processing system of claim 28, wherein the two-dimensional image classifier comprises a deconvolutional neural network communicatively coupled to the output of the convolutional neural network.

31. A robotic device comprising:
at least one capture device to provide frames of video data comprising one or more of depth data and colour data, said depth data indicating a distance from the capture device for a plurality of image elements;
an apparatus for detecting objects in video data comprising:
an image-classifier interface to receive two-dimensional object-label probability distributions for individual frames of video data;
a correspondence interface to receive data indicating, for a given frame of video data, a correspondence between spatial elements within the given frame and surface elements in a three-dimensional surface element representation, said correspondence being determined based on a projection of the surface element representation using an estimated pose for the given frame; and
a semantic augmenter to iteratively update object-label probability values assigned to individual surface elements in the three-dimensional surface element representation, wherein the semantic augmenter is configured to use, for a given frame of video data, the data received by the correspondence interface to apply the two-dimensional object-label probability distributions received by the image classifier interface to object-label probability values assigned to corresponding surface elements;
one or more movement actuators to move the robotic device with the three-dimensional space; and
a navigation engine to control the one or more movement actuators,
wherein the navigation engine is configured to access the object-label probability values assigned to individual surface elements in the three-dimensional surface element representation to navigate the robotic device within the three-dimensional space.

32. The robotic device of claim 31, wherein the navigation engine is configured to identify entry and exit points for a room based on the object-label probability values assigned to surface elements in the three-dimensional surface element representation.

33. A mobile computing device comprising:
at least one capture device arranged to record frames of video data comprising one or more of depth data and colour data, said depth data indicating a distance from the capture device for a plurality of image elements, and
an apparatus for detecting objects in video data comprising:
an image-classifier interface to receive two-dimensional object-label probability distributions for spatial elements of individual frames of video data, wherein the object-label probability distribution for each of the spatial elements includes a set of object-label probability values, and each of the set of object-label probability values indicates a probability that the respective spatial element is an observation of a different respective object;
a correspondence interface to receive data indicating, for a given frame of video data, a correspondence between spatial elements within the given frame and surface elements in a three-dimensional surface element representation, said correspondence being determined based on a projection of the surface element representation using an estimated pose for the given frame; and
a semantic augmenter to iteratively update object-label probability values assigned to individual surface elements in the three-dimensional surface element representation, wherein the semantic augmenter is configured to use, for a given frame of video data, the data received by the correspondence interface to apply the two-dimensional object-label probability distributions received by the image classifier interface to a set of object-label probability values assigned to corresponding surface elements, wherein each of the set of object-label probability values for each of the surface elements indicates a probability that the respective surface element represents a different respective object.

34. A non-transitory computer-readable storage medium comprising computer-executable instructions which, when executed by a processor, cause a computing device to perform the video processing method for detecting objects in video data, comprising:
determining object-label probability values for spatial elements of frames of video data using a two-dimensional image classifier, wherein the object-label probability value for each of the spatial elements indicates a probability that the respective spatial element is an observation of a particular object;

identifying surface elements in a three-dimensional surface element representation of a space observed in the frames of video data that correspond to the spatial elements, wherein a correspondence between a spatial element and a surface element is determined based on a projection of the surface element representation using an estimated pose for a frame; and updating object-label probability values for the surface elements based on the object-label probability values for corresponding spatial elements to provide a semantically-labelled three-dimensional surface element representation of objects present in the video data, wherein the object-label probability value for each of the surface elements indicates a probability that the respective surface element represents the particular object.

* * * * *